US00RE43251E

(19) United States
(12) Reissued Patent
Anderson et al.

(10) Patent Number: US RE43,251 E
(45) Date of Reissued Patent: Mar. 20, 2012

(54) FRAME FOR A WALL OPENING AND METHODS OF ASSEMBLY AND USE

(76) Inventors: Justin J. Anderson, Mendon, UT (US); Bruce Anderson, Mendon, UT (US); Thayne Anderson, Mendon, UT (US); Audrey E. Anderson, Corvalis, OR (US)

(21) Appl. No.: 10/165,693

(22) Filed: Jun. 6, 2002

Related U.S. Patent Documents

Reissue of:
(64) Patent No.: 6,070,375
Issued: Jun. 6, 2000
Appl. No.: 09/121,292
Filed: Jul. 23, 1998

U.S. Applications:
(63) Continuation-in-part of application No. 08/857,132, filed on May 15, 1997, now Pat. No. 5,996,293.

(60) Provisional application No. 60/026,439, filed on Sep. 20, 1996.

(51) Int. Cl.
*E06B 3/16* (2006.01)
*E06B 3/22* (2006.01)

(52) U.S. Cl. ..... 52/204.54; 52/208; 52/209; 52/215; 52/656.2; 52/656.5; 52/656.6; 52/656.9; 49/504

(58) Field of Classification Search ..... 52/127.2, 52/127.3, 209, 211, 213, 302.1, 302.3, 208, 52/204.1, 204.53, 204.54, 214, 215, 656.1–656.6, 52/656.9, 577
See application file for complete search history.

(56) References Cited

U.S. PATENT DOCUMENTS 3,131,793 A 5/1964 Bohn
3,443,346 A 5/1969 Eggert, Jr.
3,835,586 A 9/1974 Gates et al.
3,995,843 A 12/1976 Kasterler
4,430,831 A * 2/1984 Kemp ..... 52/204.53
4,589,624 A 5/1986 Jones
4,756,135 A 7/1988 Citrullo et al. ..... 52/656
5,090,168 A 2/1992 Fast
5,095,672 A 3/1992 Tanikawa (Continued)

FOREIGN PATENT DOCUMENTS

CA 1146418 5/1983

(Continued)

OTHER PUBLICATIONS

Photo 1: This photo shows the frame laying on a floor. It has 4 sides so labeled in red ink.

(Continued)

*Primary Examiner* — Mark Wendell
(74) *Attorney, Agent, or Firm* — Holme Roberts & Owen LLP

(57) ABSTRACT

A frame is formed of side walls that are extruded from vinyl. The side walls have interior channels. The side walls may be formed to effect a female-male connection between the ends of two adjoining side walls. Alternatively a locking member is provided that is sized to frictionally engage a selected channel. The side walls have a concrete retention fin positioned to extend away from the outer wall of the side wall to interconnect with the concrete as the and after the concrete cures. The frame may be formed into door jambs, doors, and the like. The frame may also be a window buck that may be formed into selected geometric shapes. Window bucks of different dimensions may be assembled on site by sawing.

37 Claims, 29 Drawing Sheets

U.S. PATENT DOCUMENTS

| | | | | | |
|---|---|---|---|---|---|
| 5,169,544 | A | | 12/1992 | Stanfill | |
| 5,239,797 | A | | 8/1993 | Oldendorf | |
| 5,319,884 | A | * | 6/1994 | Bergeron | 49/504 |
| 5,433,054 | A | * | 7/1995 | Langenhorst | 52/656.9 |
| 5,444,947 | A | * | 8/1995 | Miller | 52/100 |
| 5,746,033 | A | | 5/1998 | Chuang | 52/656.1 |
| 5,791,103 | A | | 8/1998 | Sawyer et al. | |
| 5,857,299 | A | * | 1/1999 | Gyllenberg et al. | 52/217 |
| 5,881,510 | A | | 3/1999 | Ole | 52/217 |

FOREIGN PATENT DOCUMENTS

| | | |
|---|---|---|
| DE | 2117645 | 10/1972 |
| DE | 7228233 | 2/1973 |
| DE | 2164521 | 6/1973 |
| DE | 2218931 | 10/1973 |
| DE | 9300299 | 3/1993 |
| DE | 4437816 | 3/1995 |
| EP | 0679792 | 11/1995 |
| FR | 2685026 | 6/1993 |
| FR | 2726842 | 5/1996 |
| GB | 2285653 | 7/1995 |
| WO | WO 9606252 | 2/1996 |

OTHER PUBLICATIONS

Photo 2: This photo shows the frame standing upright. The up direction is marked on the front in red ink. The sides are marked to correspond with the markings of photo 1.
Photo 3: This a close up of one corner of the frame of photos 1 and 2 from the front. The sides are marked in red ink.
Photo 4: This is a close up of the corner of the frame from a position above it and to the side. The sides are marked in red ink.
Photo 4: This is a close up of the corner of the frame from a position above it and to the side. The sides are marked in red ink. The right side is shown in detail.
Photo 5: This is a close up of the frame from a position above it and to the side. The sides are marked in red ink. The left side is shown in detail.

* cited by examiner

FRAME FOR A WALL OPENING AND METHODS OF ASSEMBLY AND USE

Matter enclosed in heavy brackets [ ] appears in the original patent but forms no part of this reissue specification; matter printed in italics indicates the additions made by reissue.

This application is a continuation-in-part of U.S. patent application Ser. No. 08/857,132 filed May 15, 1997 which is now U.S. Pat. No. 5,996,293 and which is a continuation of U.S. Provisional Patent Application Ser. No. 60/026,493 filed Sep. 20, 1996.

BACKGROUND OF THE INVENTION

1. Field of the Invention

The present invention relates to frames used for forming an opening in a structure wall such as a poured concrete wall and a structure wall formed with an insulated concrete form.

2. State of the Art

When constructing a building, it is frequently desirable to position a window, door, garage door, or other opening, in a structure wall such as a poured concrete wall or in a wall made from concrete using an insulated concrete form. Procedures for forming an opening have included manufacturing a frame from wood and positioning the frame within a pair of forms used for forming a concrete wall or insulated concrete forms used for forming an insulated concrete wall. Typically, the frame is positioned between the pair of forms after which the concrete is poured into the form and about the frame. Therefore, the desired opening is defined in the wall when the concrete hardens or cures. Thereafter, the window form has been removed and replaced with structure that is used to size the opening and to provide structure for receiving and attaching the window unit itself.

U.S. Pat. No. 4,430,831 discloses a window buck formed of a series of sides or channels joined together with nails in an end-to-end relationship to define a rectangular opening. The window buck is a window form which is assembled and positioned so that concrete may be poured around it. U.S. Pat. No. 4,589,624 (Jones) also shows a window buck which is provided for forming a window opening in a cast concrete wall. The buck is removable after the concrete wall is formed in order to proceed with further installation of a window.

U.S. Pat. No. 5,169,544 (Stanfill et al.) also describes a buck for use in construction. The buck has internal bracing so that it does not deform or change dimension when the concrete wall is poured about it.

In order to facilitate construction, it would be desirable to have a frame such as and including a window buck which can be easily assembled on site and which thereafter can be installed and remain in place. The frame would preferably be one that is easily sized and shaped and also which is formed to receive a finished insert such as a door or window after the concrete wall has been poured and cured. It would also be desirable to have a frame that could be used with insulated concrete forms.

SUMMARY

A frame for forming an opening in a structure wall includes side member means assembled to define the opening. The side member means is formed to have a perimeter and a width. The width is substantially the width of the structure wall into which the frame is to be placed. That is, when the assembly is complete and the wall formed, the frame is approximately coextensive with the wall in width. In a preferred arrangement the frame has flanges that embrace or contain the wall there between.

The side member means has an inner wall facing toward the interior of the opening and an outer wall spaced away from the interior wall and the opening. A plurality of internal channels are formed between the inner wall and the outer wall. Retention means is mechanically associated with the outer wall and formed to extend away therefrom for mechanical association with the structure wall. The retention means is one or more extensions associated with and desirably unitarily formed with the the exterior wall. In a selected arrangement the retention means is a rib formed unitarily therewith. The retention means also more preferably has a securement member proximate an outer end which may be a lip formed to be normal to the rib.

The side member means has two ends that are formed for positioning proximate each other for interconnection to each other by connector means. In one embodiment the connector means has a locking member with a first member sized and shaped for insertion into a selected one of the plurality of channels in one of the two ends. The locking member has a second member sized and shaped for frictional insertion into and engagement with a corresponding selected one of the plurality of channels in the other of the two ends.

In an alternate arrangement, the side member means includes a female side member and a male side member. The connector means is structure formed at the ends of the female side member and the male side member to effect a male-female connection between the ends of the female member and said male member.

The side member means may be formed to define a circular shaped perimeter or a perimeter in a plurality of geometric shapes.

The side member means preferably includes a plurality of separate sides, each of which is formed to have two ends. Even more preferably each side member is each secured to its adjacent side member proximate one end of the adjacent side member. The connector means includes a connector configured for joining the two ends of each of said four separate sides.

The opening formed by the frame may be a door opening in which the side members are formed to define at least the top and the two sides of the door opening. The opening may be a garage door opening, a window or any other opening to be formed in a structural wall.

In one preferred embodiment, the side member means is four separate sides assembled to define a rectilinearly shaped window buck. The window opening has a top and a bottom; and the four separate sides include a bottom side oriented toward the bottom of the window opening. The bottom side preferably includes aperture means formed therein and sized to receive concrete therethrough.

Each of the side members includes a plurality of channels extending lengthwise between said inner wall and said outer wall. The channels are desirably side by side and hollow and formed to extend the length of each side member. The channels may be selectively filled with insulating material if desired.

In a desired embodiment, the first side member has one channel of its plurality of channels formed to define a first opening at both of its ends. A second side member is similarly formed. The connector means is locking member which has a first member sized and shaped for insertion into and engagement with the first opening in the first end of both the first side member and a second member similarly sized and shaped for insertion into a second opening in the second member. The first member and the second member are in a desired configuration a male structure formed for engagement with said first opening of said first side member and a male structure for engagement with the second opening of the second side member.

In alternate and preferred arrangements, each channel of the plurality of channels has a longitudinal axis. The longitudinal axis of each channel of the plurality of channels are in alignment.

The structure wall has an interior surface and an exterior surface. In selected configurations, the first side member and the second side member each have an interior flange connected to its respective outer wall. The flanges are positioned to extend away from the respective side member and along the interior surface of the structure wall. Similarly the first side member and the second side member each have an exterior flange mechanically associated with its respective outer wall. The exterior flange is formed to extend away therefrom and substantially along the exterior surface of the structure wall.

In use, side members may be cut such as by sawing on site to achieve a desired size. As a result end pieces or remnants may be available so that a side member may be formed therefrom. That is, a side member alternately is formed from a first section and a second section joined to each other. Each of the first section and the second section have a first end and a second end having at least one aperture formed therein, fastener is sized to snugly insert into the selected apertures of said first section and said second section to secure said first section to said second section preferably in an abutting relationship and in axial alignment.

Methods of forming the frame including a window frame include forming at least three side members from stock to a desired size. One side member will be formed to be the top of the frame. Two side members are also formed from the stock to a desired dimension. A bottom member is desired for a window frame. If the opening is a door or door-like opening in the structure wall, a bottom may not be required or desired. If the opening is a window opening or a window-like opening, it may be formed from bottom stock in which the inner wall and the outer wall have apertures formed therein to receive cement therethrough. The side members are assembled together by securing each to its adjacent side member or members with the connectors. The connectors have male ends sized for frictional engagement in a selected channel formed in the side members.

Once the frame is assembled, it may be installed in the forms for the concrete. The forms may be standard concrete wall forms or insulated concrete forms. Once installed, it typically is braced by attaching an angle brace at one or more selected corners of the assembled frame based on the size of the frame. In addition, other metal or wooden braces may be used to extend between the top and bottom side members and/or the opposite vertical side members. Bracing is provided using in a conventional manner with one metal or wooden brace being provided for approximately every three feet of opening.

BRIEF DESCRIPTION OF THE DRAWINGS

In the drawings which illustrate what are presently regarded to be the best modes of carrying out the invention.

DETAILED DESCRIPTION OF THE ILLUSTRATED EMBODIMENT

Figure 1:
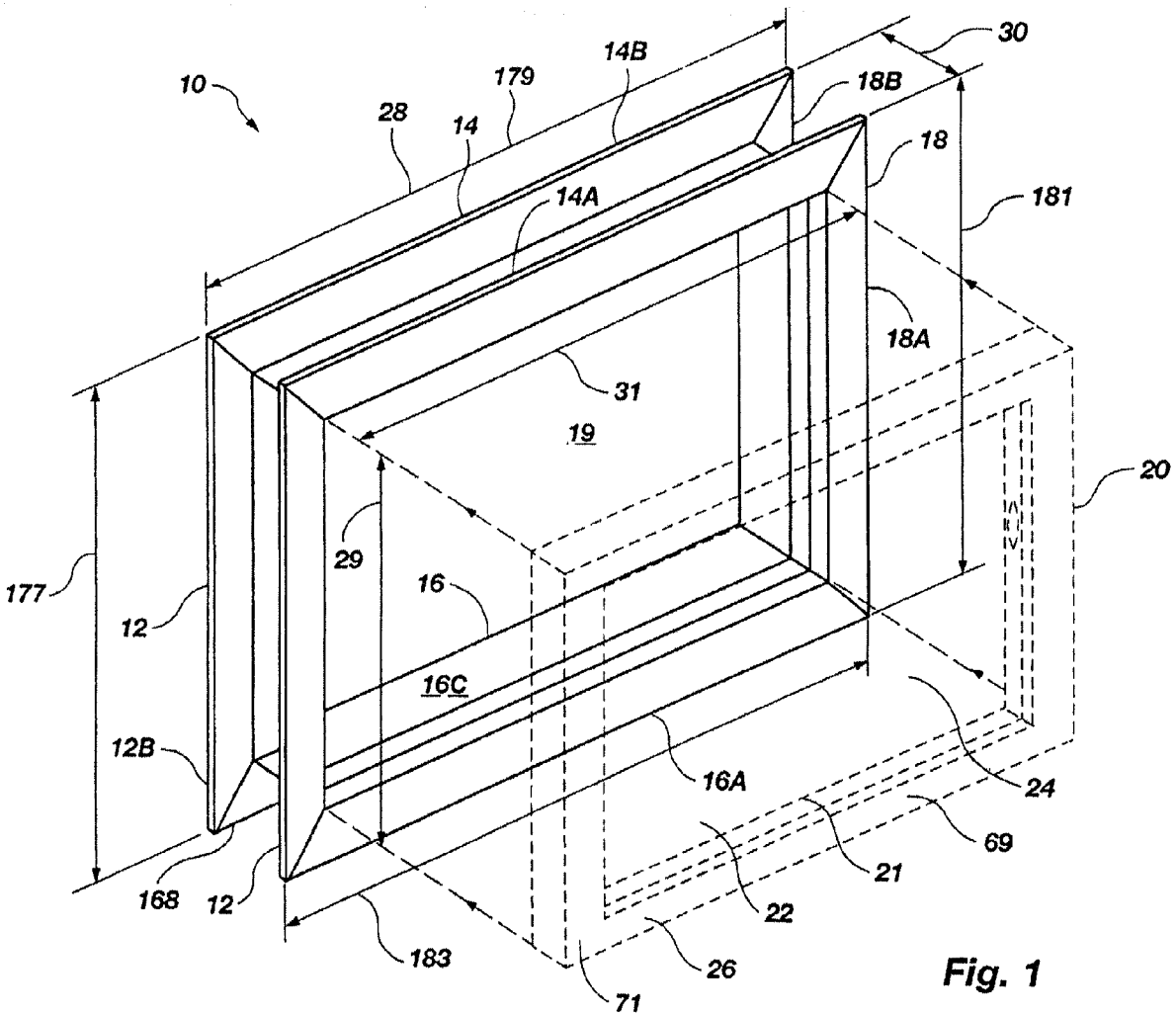
FIG. 1 is a window buck of the present invention with a proposed window frame for insertion depicted in phantom.

In FIG. 1, one embodiment of a window buck 10 has side member means which may include one (FIG. 6) or a plurality of side members. In FIG. 1, the window buck 10 is rectilinear in projection with a left side member 12, a top side member 14, a bottom side member 16 and a right side member 18. A window 20 is shown in phantom sized for positioning within the window buck 10 after construction of a wall as more fully discussed hereinafter. The window 20, as shown, has a left window pane unit 22 and a right window pane unit 24, both of which slide in a track 21 attached to the frame 26.

Figure 3:
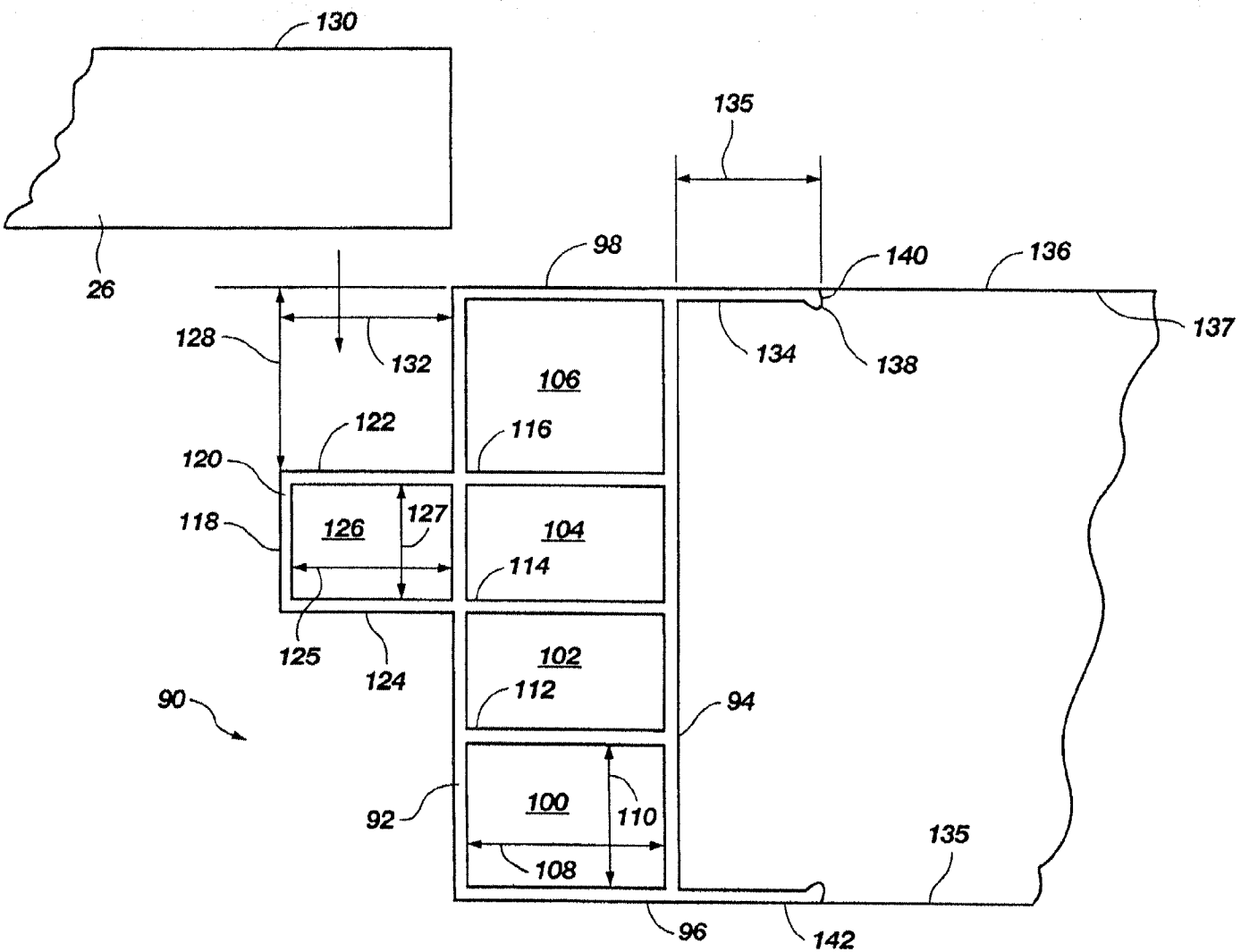
FIG. 3 is a cross section of an alternative side member for use with the window buck of the present invention.

The left side member 12, the top side member 14, the bottom side member 16 and the right side member 18 are each formed to have a length 28 and a width 30. The length 28 and width 30 is selected to define a window opening of the desired size and configuration and more particularly of a height 29 and a width 31 that is for a standard sized or commercially available window 20. The width 30 is selected to be substantially the width of the wall into which the window buck 10 is to be placed. That is, the width 30 is selected so that the internal flanges 12A, 14A, 16A and 18A are exposed and extend along the inner surface 137 of the wall 136 (FIG. 3). Similarly, external flanges 12B, 14B, 16B and 18B are exposed and extend along the outer surface 135 of wall 136.

The left side member 12, the top side member 14, the bottom side member 16 and the left side member 18 are each formed preferably of a vinyl material that is extruded. However, they may be formed from other materials including fiberglass, Teflon, aluminum, aluminum alloys, and other similar materials. The preferred material is low cost and resistant to corrosion while having sufficient structural strength to support, for example, the cement when the wall is formed. The preferred material is also one that may be made readily cut such as by a hand saw or hand held power saw. The preferred material is also one that can be formed in different colors if desired.

Figure 2:
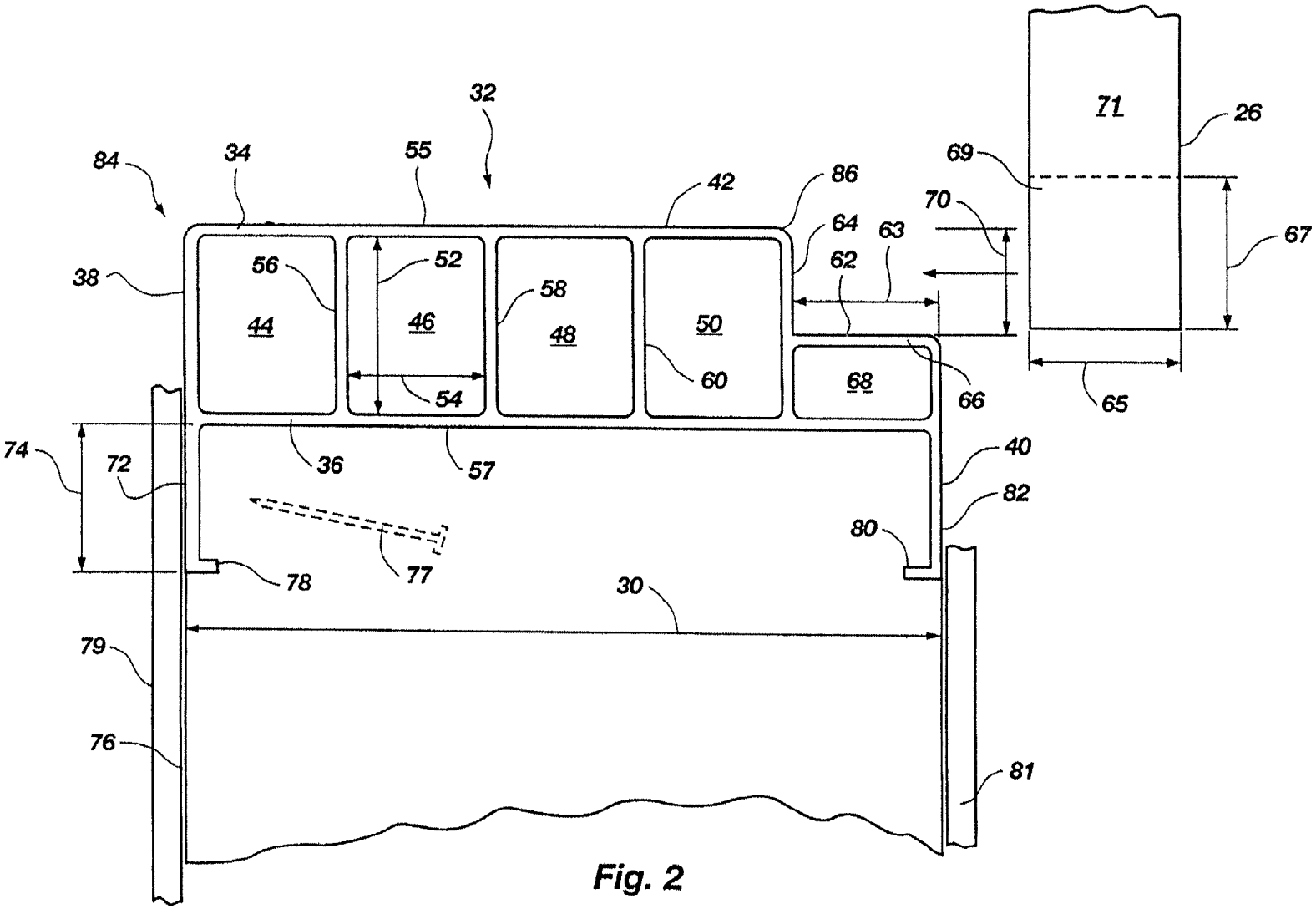
FIG. 2 is a cross-section of a side member for use with the window buck of the present invention.

FIG. 2 shows a side member 32 which has a top wall 34 and a bottom wall 36. It also has a first outside wall 38 and a second outside wall 40. The top wall 34 defines an interior surface 42 of the window buck and, in turn, provides a surface that faces toward the interior of the buck which is the opening 19 defined by the buck and the window (e.g., window 20) installed therein. The inwardly facing surface 16C of the bottom side member 16 acts as a window sill.

Between the top wall 34 and the bottom wall 36 is a plurality of channels 44, 46, 48 and 50. Each of the channels 44, 46, 48 and 50 is sized and shaped to be substantially the same in height 52 and width 54. Separating walls 56, 58, 60 and 64 are formed in-between the top wall 34 and the bottom wall 36 to define the channels 44, 46, 48 and 50 and to strengthen the side member 32 so that it is structurally strong and has sufficient rigidity to maintain dimensional integrity when in use. That is, each channel 44, 46, 48 and 50 has a plurality of sidewalls each of which is preferably rectangular in projection with four sidewalls such as sidewalls 56 and 58 as well as sidewalls 55 and 57. The sidewalls 55 and 57 are also part of the interior surface 42 and the bottom wall 36.

As can be seen in FIG. 2, the top wall 34 steps down to a ledge 62 defined by the separating wall 64 and a ledge wall 66 as well as the second outside wall 40. The ledge 62, second outside wall 40 and ledge wall 66 as well as the bottom wall 36 together define a smaller channel 68 as shown.

The frame 26 of the window 20 is sized so it can be slid into position on the ledge 62 and for abutment against the separating wall 64 to, in turn, provide for installation of the window 20 within the window buck 10 defined by the left side member 12, the top side member 14, the bottom side member 16 and the right side member 18. It may be noted that the ledge 62 is spaced a distance 70 below the top wall 34. The distance 70 is selected to provide for some dimensional variations in the window frame 26 while still providing an appropriately sufficient amount of surface of the separating wall 64 to facilitate installation using screws, nails, glue or the like. The distance 70 is also preferably selected to be less than the height 67 of the lower element 69 of the frame 26. The ledge 62 has a width 63 that is preferably at least the width 65 of the separate members of the frame 26 such as members 69 and 71.

In FIG. 2 it can also be seen that the side member 32 has a lower portion 72 of the first outside wall 38 which functions as an outside flange and which extends below the bottom wall 36 a distance 74, which is comparable to the height 52 of the channels 44, 46, 48 and 50. The distance 74 may vary as desired by the user to provide for sufficient connection to the cement wall 76 when the concrete (or the like) used to form the wall 76 dries after being poured. That is, the distance 74 of the portion 72 is selected to provide for a rigid attachment to the cement wall 76. It is also selected so that fasteners such as nail 77 may be used to secure the window buck to a fiberglass external cement form 79 used to define, with internal cement form 81, a cavity or void into which cement is poured to form the wall 76. The finger 78 associated with the lower portion 72 of the first outside wall 38 and the finger 80 associated with lower portion 82 of the second outside wall 40 extend inwardly in order to rigidly secure the side member 32 and, more particularly, the window buck 10 in place after the concrete hardens or solidifies to form wall 76.

It may be noted that side member 32 may be formed of an extruded vinyl material. When extruded, it may have rounded corners such as the left corner 84 and the right corner 86. The rounding of corners is not necessary. They may be formed in any manner desired to facilitate assembly and construction and an appearance desired by the user.

Referring now to FIG. 3, an alternative side member 90 is illustrated in cross-section. The side member 90 has a top wall 92 and a bottom wall 94. It also has a left wall 96 and a right wall 98. In the space between the left wall 96 and the right wall 98 is a plurality of channels 100, 102, 104 and 106, each sized and shaped to have essentially the same height 108 and essentially the same width 110. Each of the channels 100, 102, 104 and 106 is separated by a separating wall such as walls 112, 114, and 116 as shown. Extending above the top wall 92 is abutment member 118. The abutment member 118 has a top wall 120 and opposite side walls 122 and 124 positioned to define a channel 126, which may be dimensioned in height 125 and width 127 the same as the height 108 and width 110 of the other channels 100, 102, 104 and 106.

The abutment member 118 is positioned spaced a distance 128 from the right wall 98 so that the frame 26 of a window 20 can be received with the outer wall 130 of the frame 26 being in general alignment with the right wall 98. Similarly, the abutment member 118 is sized to have a height 132 to provide for dimensional variances in the frame 26 of the window 20.

It may also be noted that the right wall 98 has an interior flange or extension 134 which extends below the bottom wall 94 a distance 135 selected to provide for secure attachment of the side member 90 to the cement wall 136. It may be noted that the extension 134 also has a bead or node 138 formed at its distal end 140 to facilitate secure attachment of the side member 90 to the cement wall 136. The left wall 96 has a similar flange or extension 142 sized in length comparable to the extension 134 of the right side wall 98. Even though the extensions 134 and 142 are noted to be substantially the same in length, they may differ if desired.

Figure 4:
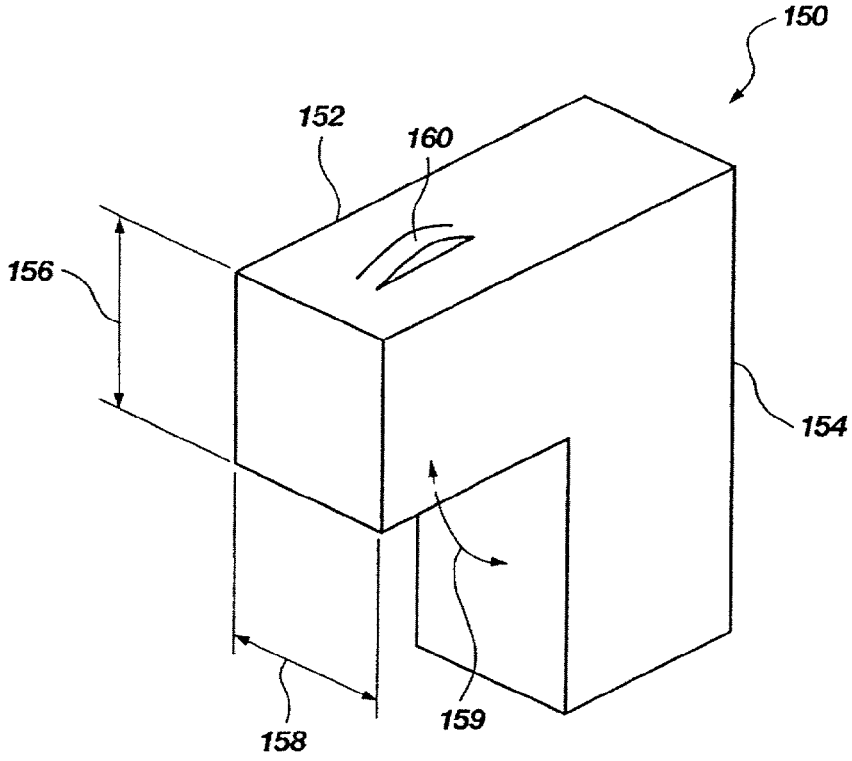
FIG. 4 is a perspective view of a locking member for use in connecting side member means of a window buck of the present invention.
Figure 5:
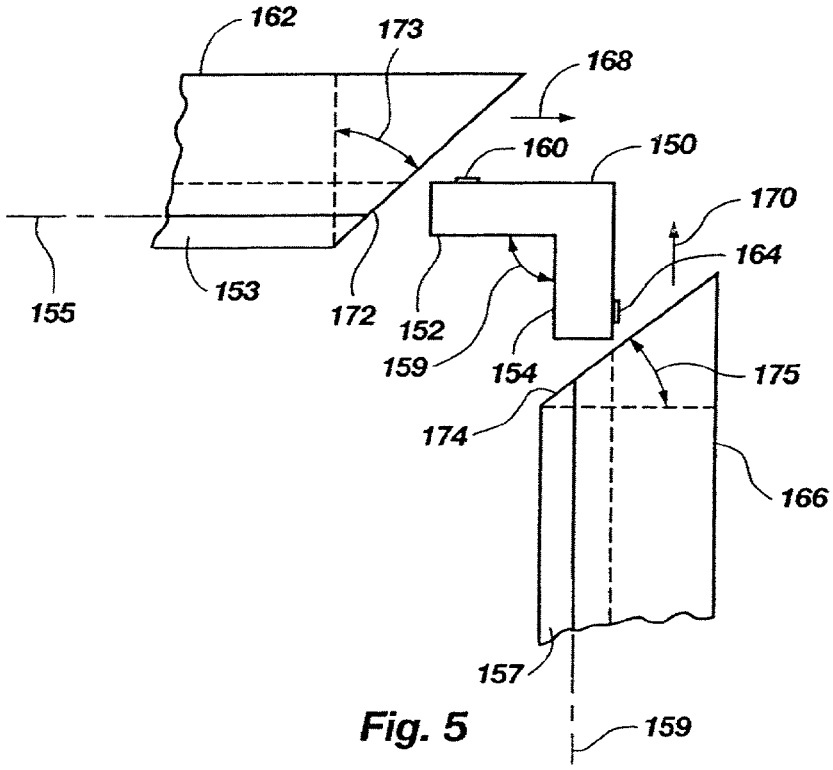
FIG. 5 is an exploded, partial side view of separate side members of the side member means of a window buck of the present invention with a locking member positioned for interconnecting the illustrated separate side members.

FIG. 4 shows a locking member 150 which may be used to interconnect adjoining side members as illustrated in FIG. 5. More specifically, FIG. 4 shows a locking member 150 for use in assembling two side members 162 and 166 as illustrated in FIG. 5. The locking member 150 is formed to use in assembling two side members 162 and 166 as illustrated in FIG. 5. The locking member 150 is formed to have a first member or leg 152 and a second member or leg 154 oriented at a right angle to each other. The legs 152 and 154 are sized in height 156 and in width 158 to be comparable to the height 52 and width 54 of the channels 44, 46, 48 and 50 of the side member 32 of FIG. 2 or the height 108 and width 110 of channels 100, 102, 104 and 106 of side member 90. The legs 152 and 154 are similarly dimensioned in height 108 and width 110 so that the legs 152 and 154 may frictionally engage and be inserted into one selected channel 100, 102, 104 and 106, or a selected one of channels 44, 46, 48 and 50.

As can be seen in FIG. 4, the leg 152 has a raised portion 160 which frictionally engages the interior surface of the selected one of channels 44, 46, 48 and 50, or channels 100, 102, 104 and 106, to provide for a more rigid, secure connection.

As best seen in FIG. 5, the leg 152 is inserted into a selected channel of the side member 162. The leg 152, with the raised portion 160, frictionally engages the interior of the selected channel. Similarly, leg 154, with a raised portion 164, frictionally engages a channel in an adjoining side member 166. The side members 162 and 166 are urged toward each other and into abutment 168 and 170 with corresponding abutting edges 172 and 174 formed at an angle 173 and 175 selected to provide for abutment. The angle 173 and 175 presently preferred is 45°. Inasmuch as multiple channels are provided in the side member 32 and the side member 90, it can be seen that one or more locking members 150 may be inserted into two or more of the channels, such as channels 44, 46, 48 and 50, or channels 100, 102, 104 and 106, to provide for a rigid connection between multiple channels of adjoining side members of a particular window buck.

More specifically, locking members, such as locking member 150, are positioned in-between to connect, for example, the left side member 12 with the top side member 14 and the top side member 14 to the right side member 18. Similar locking members 150 are used to interconnect the bottom side member 16 with the left side member 12 and the right side member 18 at their respective corners.

Obviously, the window buck 10 may be shaped and sized in height 177 and in width 179 (FIG. 1) as desired. That is, height 177 and width 179 may be selected to receive conventional or preassembled windows such as window 20. In selected circumstances, the user may take a length of side wall and cut it to a desired dimension to form a window of desired dimensions and assemble it using a locking member, such as locking member 150 of FIG. 4 or other suitably formed locking members. After the concrete wall 76 (136) is formed, a window 20 can be constructed and installed in any available opening with extensions such as extensions 134 and 142 (FIG. 3) frictionally engaging the wall 136. A window buck 10 may also be used in wooden, block and brick walls as well as walls of other materials.

Preferably, the left side member 12, the top side member 14, the bottom side member 16 and the right side member 18 (FIG. 1) may all be precut and assembled in a carton with the necessary locking members 150 so that a user may simply assemble the window buck 10 on site prior to installation. Therefore, the window buck 10 may be easily stored before use because it is disassembled, reducing the amount of space necessary for shipment and minimizing the amount of damage occurring during transportation to and minimizing storage requirements on the construction site prior to installation.

Figure 6:
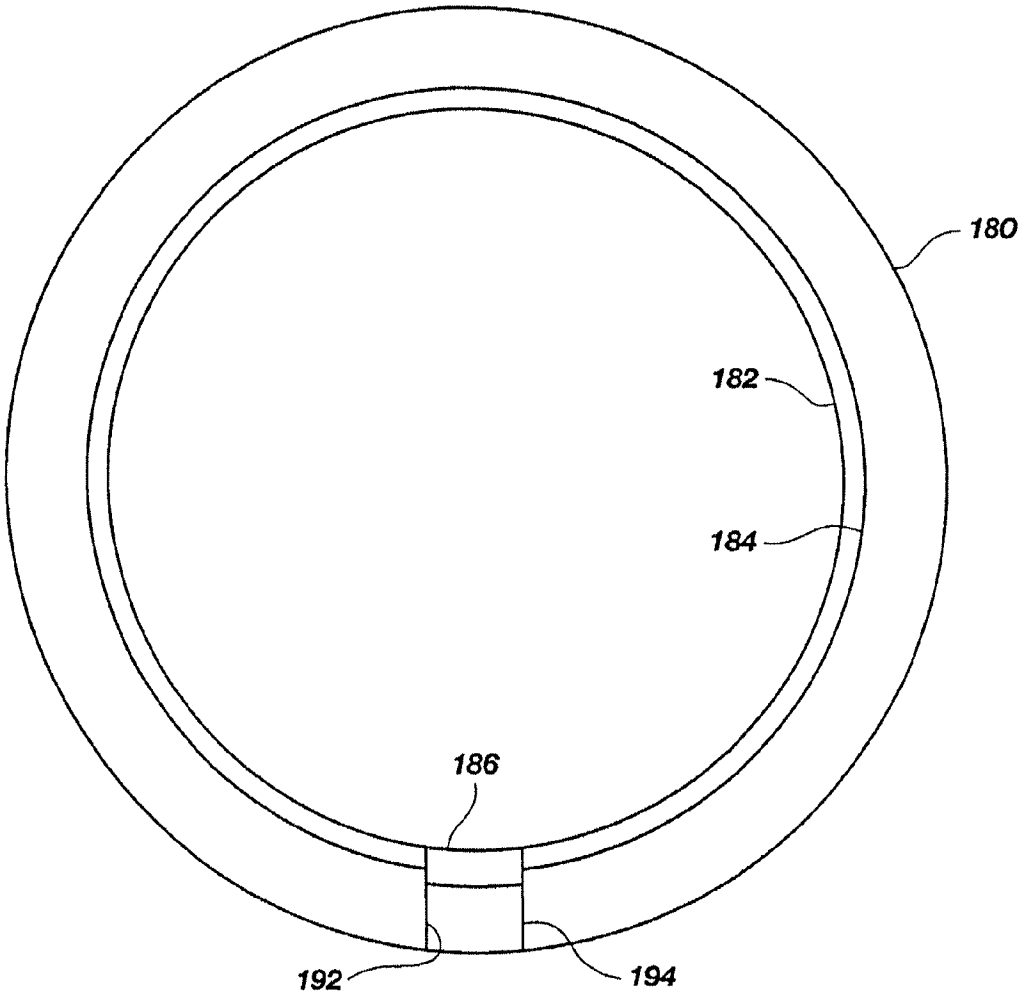
FIG. 6 is a top view of a circular shaped window buck of the present invention.
Figure 7:
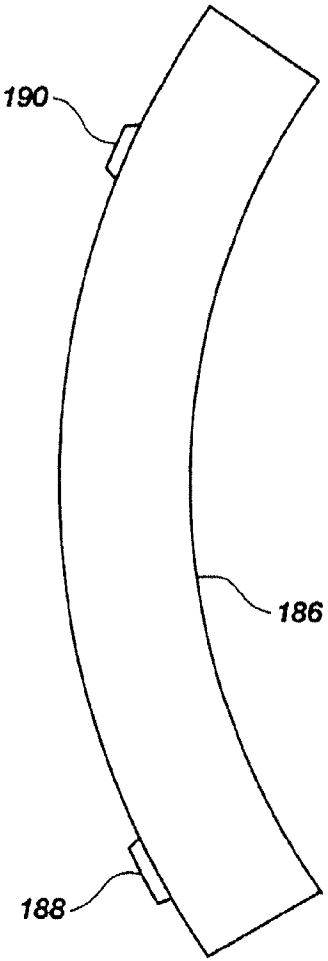
FIG. 7 is a locking member for use with a window buck of FIG. 6.

FIG. 6 shows a side member 180 which is shaped to be circular in projection. It has an interior wall 182 with a ledge 184 so that in cross-section it is similar to the cross-section shown in FIG. 2. The locking member 186, shown in FIG. 7, also is sized and shaped to fit within an interior channel formed in the side member 180. The locking member 186 has a left raised portion 188 and a right raised portion 190 to provide for frictional engagement within the selected channel of the side member 180. As can be seen, the side member 180 has a first end 192 configured to abut the other end 194 when assembled with the locking member 186 interiorly positioned within a selected channel. A plurality of locking members 186 may be used if desired with a plurality of channels formed within the side member 180.

It should also be recognized that the side members such as left side member 12, top side member 14, bottom side member 16 and right side member 18 may be cur and assembled into shapes other than the rectilinear shape shown in FIG. 1. That is, locking members having an angle 159 other than 90° may be used to develop geometric shapes that may be triangular, diamond shaped, octagonal, or some other polygon with a perimeter. That is, the perimeter of the window buck 10 of FIG. 1 includes the length 28 and the height 177, as well as height 181 and width 183 for a rectilinear window buck 10 and window 20. Alternatively, side members may be formed in half circle sections or other geometric forms and used with curvilinear or straight sections in-between to develop a substantially elliptical window buck or window buck of any desired shape.

Although the window buck is herein stated to be formed of an extruded vinyl, other materials may be used including, in some cases, aluminum if desired. However, the preferred material is vinyl or vinyl-type material or vinyl-like material. Vinyl is preferred because it is strong yet not brittle. It can be cleaned, does not need to be painted or preserved and can be nailed or glued. Also, it can be cut with a saw or similar cutting tool.

It may be also noted that the channels 44, 46, 48 and 50, as well as the channels 100, 102, 104, 106 as well as channels 68 and 126, may each be filled with an insulation material if desired. Appropriate insulation materials include, for example, an expanded polyurethane foam as well as fiberglass materials or any other similar material that would increase the thermal resistivity to reduce heat loss through the window buck after construction of the window is complete.

In an alternative and more preferred arrangement, the window buck 10 of the invention has at least two side wall members. The sidewall members each have a first end and a second end. One of the first ends and one of the second ends are formed to connect with the other. One end of the side wall member is a female member 200 shown in perspective in FIG. 8. The female member 200 is formed comparable to the side member 32 of FIG. 2 with a substantially similar length 202, height 204 and width 206. It has channels 210, 212, 214 and 216 formed in it along with a side portion 218 and 220 sized to embrace the concrete wall in a manner similar to side member 32. The female member 200 also has a ledge 222 formed as shown to receive the window after the concrete wall is poured and hardened.

The female member 200 has a surface 224 facing to the interior of the window buck. The surface has three slots 226, 228 and 230 formed in a line as shown. Each slot 226, 228, 230 has a width 232 and a length 234 substantially the same and selected to snugly receive corresponding tongues from the male member 240 shown in FIG. 9 as discussed hereinafter. Each slot 226, 228 and 230 extends through the surface 224. The slots 226, 228 and 230 are each spaced a distance 236 selected to correspond to the width of channels formed in the male member as discussed hereinafter.

The female side member 200 has two ends, which are the same except for their orientation. The female side member 200 may come in a length 202 larger than needed for a desired window buck and in turn may be cut to form an essentially straight end 238. That is, the end 238 is substantially planar and presents what could be said to be an effectively flat surface.

The female side member 200 may be formed with the slots 226, 228 and 230 preformed and spaced in a plurality of rows such as rows 237 and 239 along the entire length 202 of the female side member. Alternatively, the slots 226, 228 and 230 may be formed on site by cutting using an appropriate tool (e.g. a chisel or drill) or by pressing out fillers that are formed by making scribe marks during formation of the female side member 200 so that upon application of a force (e.g., pressing with a punch or screw driver tip) the filler breaks along the scribed lines to thereby form the desired slots such as slots 226, 228 and 230 or other slots in other rows such as rows 237 and 239. The scribed lines shown by dotted line for the slots of rows 237 and 239 such as slot 235 are weakened portions of the surface so that application of pressure causes the filler such as filler 233 to easily separate and cause the desired slot to appear.

Figure 9:
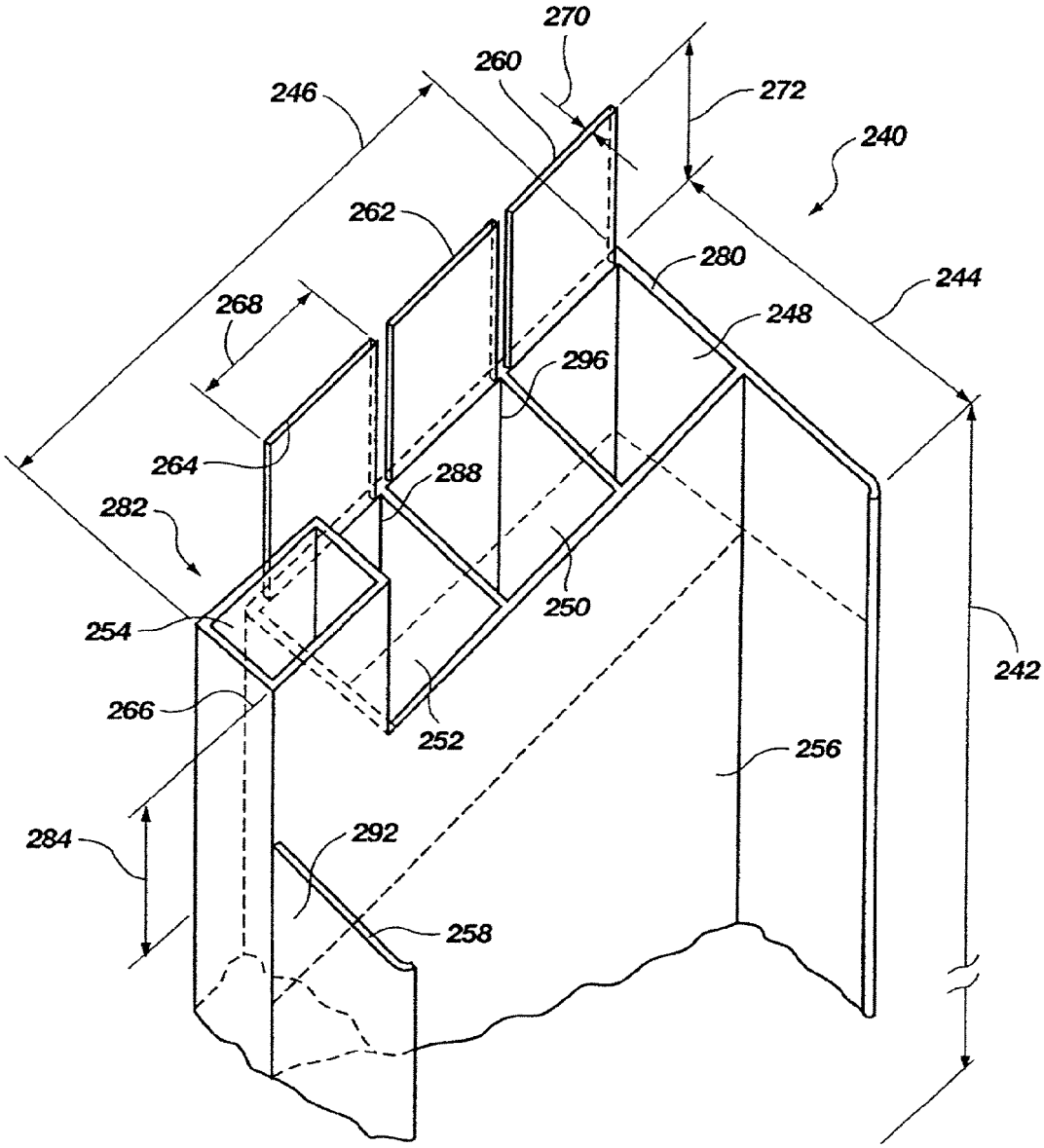
FIG. 9 is a partial perspective view of a male side member of an alternate embodiment of the present invention.

Referring now to FIG. 9, a side member has one end formed to connect to one other end of an adjoining member. The side member is a male side member 240 shown in partial perspective with a length 242, height 244 and width 246 comparable to member 32 of FIG. 2. It is formed with channels 248, 250, 252 and 254 comparable to the channels formed in the side member 32 of FIG. 2. The male side member 240 also has side portions 256 and 258 to embrace the concrete wall when it is formed.

The male side member 240 also has three tongues 260, 262 and 264 extending upwardly from and along the interior surface 266. The tongues 260, 262 and 264 are each substantially the same in dimension and have a length 268 and a width 270 selected to snugly register with the corresponding slots 226, 228 and 230 of the female side member 200. The tongues 260, 262 and 264 are sized in height 272 to extend into the respective channels 210, 212 and 214 of the female member and to either contact the interior surface 276 of those channels or be short of it. That is, the channels 210, 212 and 214 have a depth 278; and the height 272 of the tongues is the same as the depth 278 or slightly less so the end 280 of the male member can snugly abut the surface 224 of the female member. That is, the end 280 of the male side member 240 is planar or flat in section and therefore can snugly abut the interior facing surface 224 of the female side member 200 when the male side member 240 and the female side member 200 are assembled.

Figure 10:
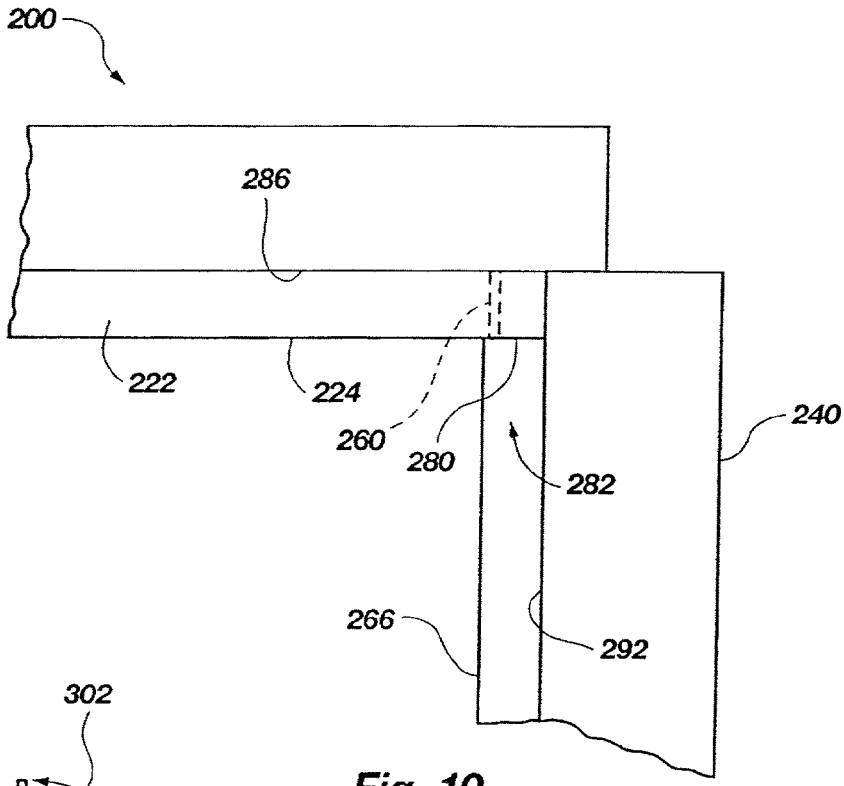
FIG. 10 is a partial front view of an assembled female side member and male side member of an alternative embodiment of the present invention.

As shown in FIG. 10, the female side member 200 and the male side member 240 are joined at their ends. The tongues 260, 262 and 264 together with the corresponding slots 226, 228 and 230 constitute connection means for attaching one end of the female side member 200 to one end of the male side member 240. More specifically, the tongues 260, 262 and 264 are inserted into the slots 226, 228 and 230. The tongues 260, 262 and 264 are urged into the slots 226, 228 and 230 until the surface 280 abuts the surface 224. The sides of the channels 248, 250 and 252 all abut the surface 224 and function as part of the connection means to mechanically limit angular rotation and twisting of the female side member 200 relative to the male side member 240 and vice versa.

As can be seen in FIGS. 9 and 10, the male side member 240 also has a ledge 282 which can be said to be defined and formed by the channel member 254 and the side wall of the channel 252. In order to have a smooth corner in the window buck formed of two male side members and two female side members, the channel 254 is cut to extend a height 284 which is selected to abut the side surface 286 of the ledge 222 and in turn form a clean and snug corner.

In order to form the tongues such as tongues 260, 262 and 264, the male side member may be cut on site to create them. Alternatively they may be formed by removing filler pieces 288 and 290 and separating them from associated structure such as the side portion 256 and the side surface 292 along scribes or perforations indicated by dotted lines.

Figure 8:
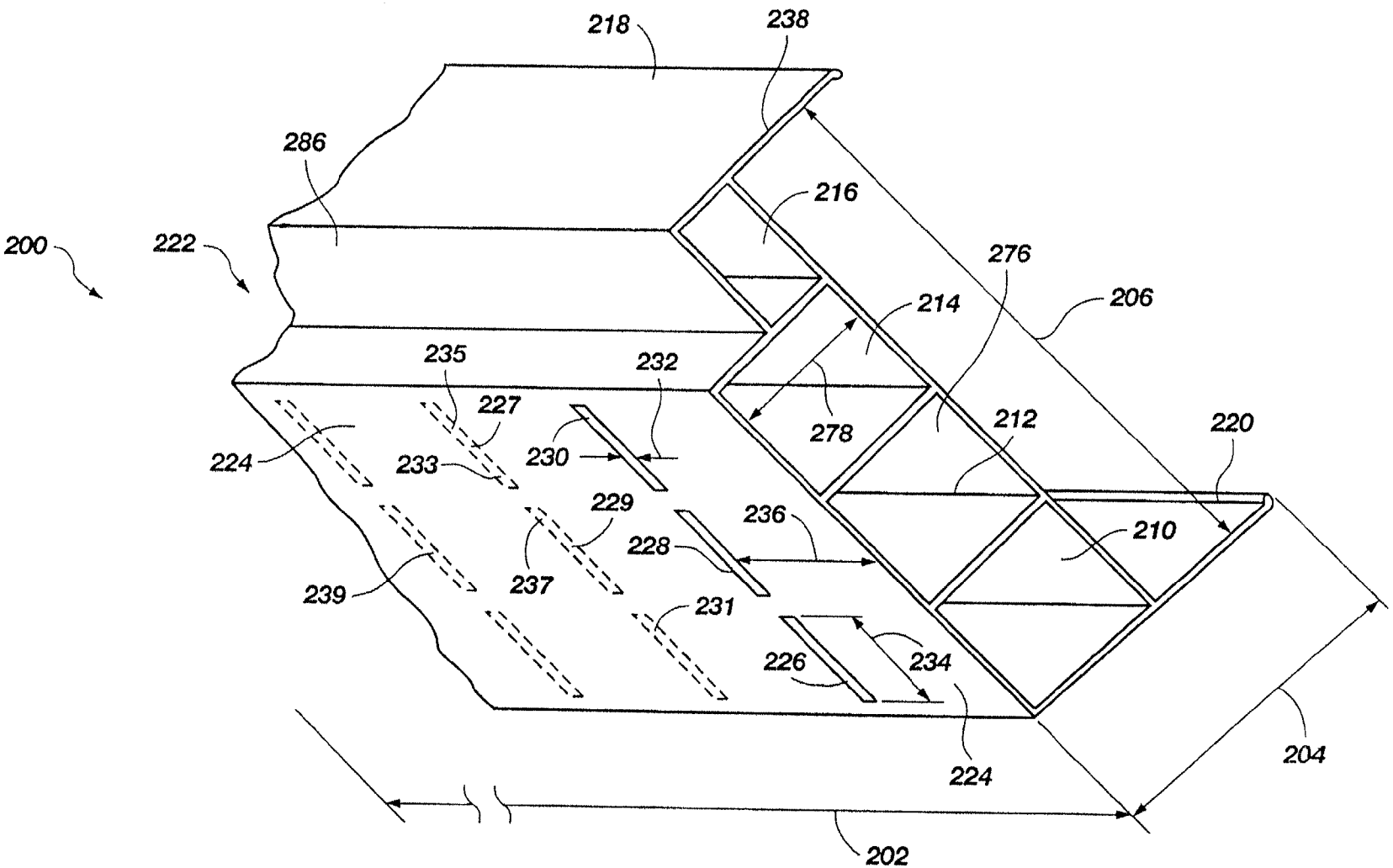
FIG. 8 is a partial perspective view of a female side member of an alternate embodiment of the present invention.

Although reference has been made to a male member having both ends formed as shown in FIG. 9 and a female member with both of its ends formed as shown in FIG. 8, it may be understood that a side member may be so arranged or may have one female end and one male end.

Figure 11:
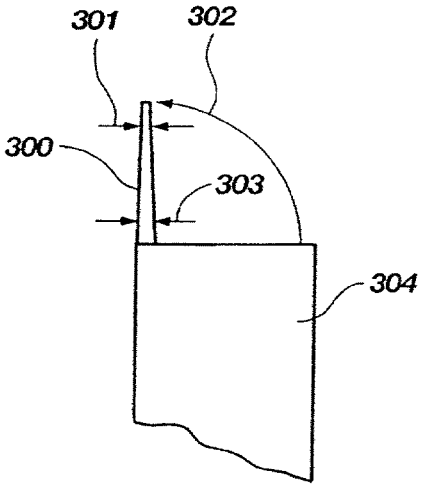
FIG. 11 is a partial side view of an alternative male member of an alternate embodiment of the present invention.

As can be seen in FIG. 11, a tongue 300 may be preformed in the channels and may be simply rotated 302 from the channel in the side member 304. The tongue 300 is formed to be tapered in width. It has a smaller width 301 near the top in relation to the width 303 near the bottom. The width 303 is selected to form a snug friction fit with a corresponding slot in a female member.

Figure 12:
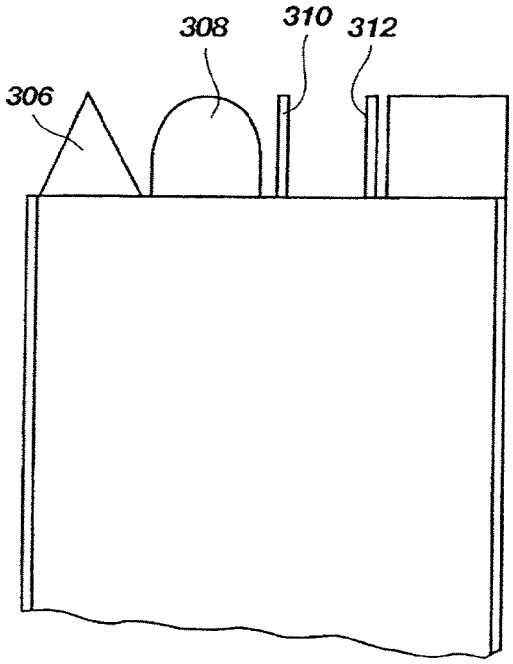
FIG. 12 is a partial side view of alternative tongues of a male member of the alternative embodiment of FIG. 9 of the present invention.

As depicted in FIG. 12, a tongue can be formed in a variety of shapes including triangular, rounded 308 or to be two spaced apart fingers or pins 310 and 312. The spaced apart fingers or pins 310 and 312 are spaced apart a distance so that the pins may snugly fit into one corresponding slot in the female side member.

Figure 13:
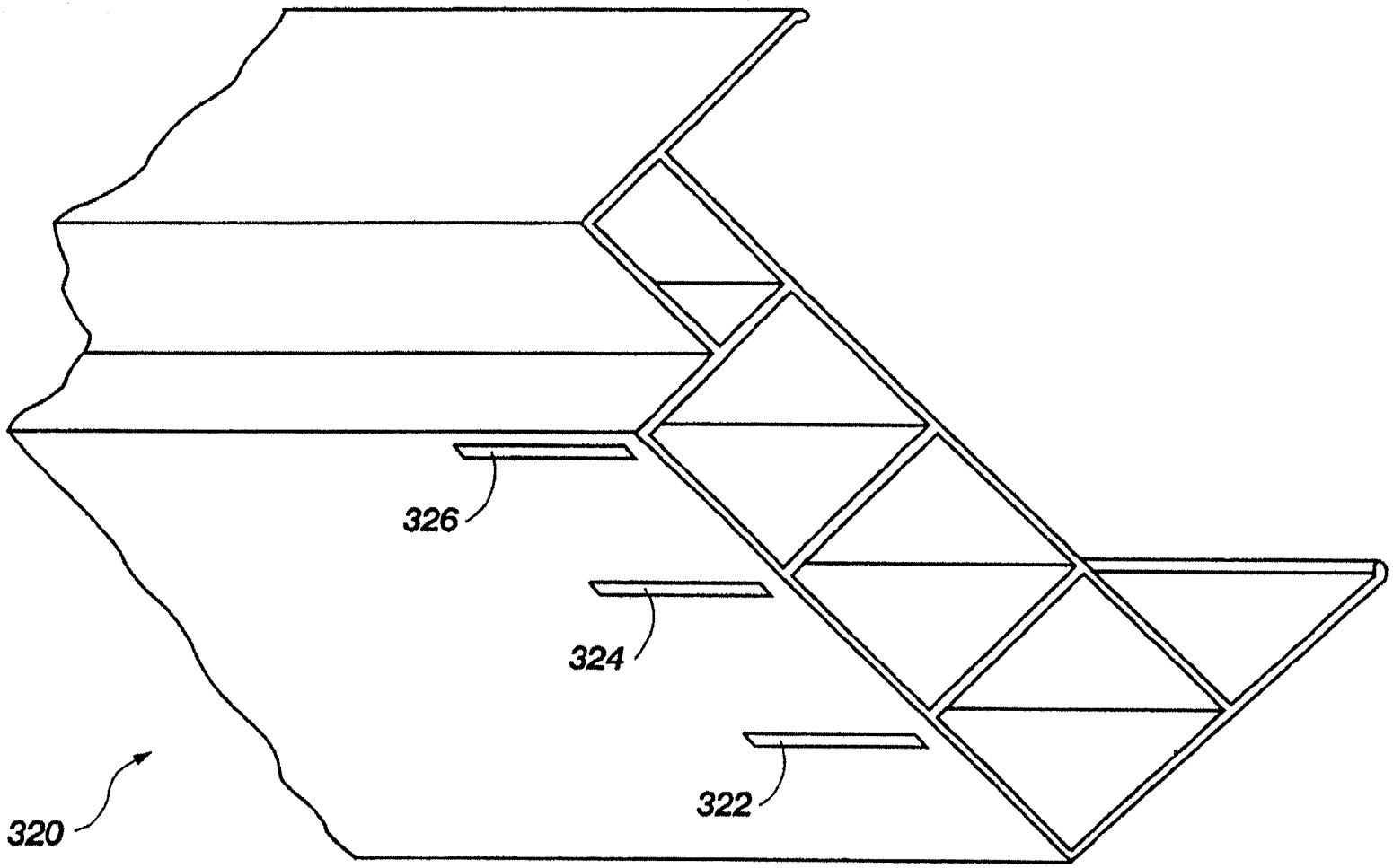
FIG. 13 is a partial perspective view of an alternative configuration of a female side member of an alternative embodiment of the present invention.

Referring now to FIG. 13, an alternative female side member 320 is shown. It is comparable to the female side member of FIG. 8 but for the slots 322, 324 and 326 which are all oriented lengthwise or along the length of the female side member. Of course the orientation of the tongues of the male members would necessarily need to be reconfigured to register with the slots 323, 324 and 326.

Figure 14:
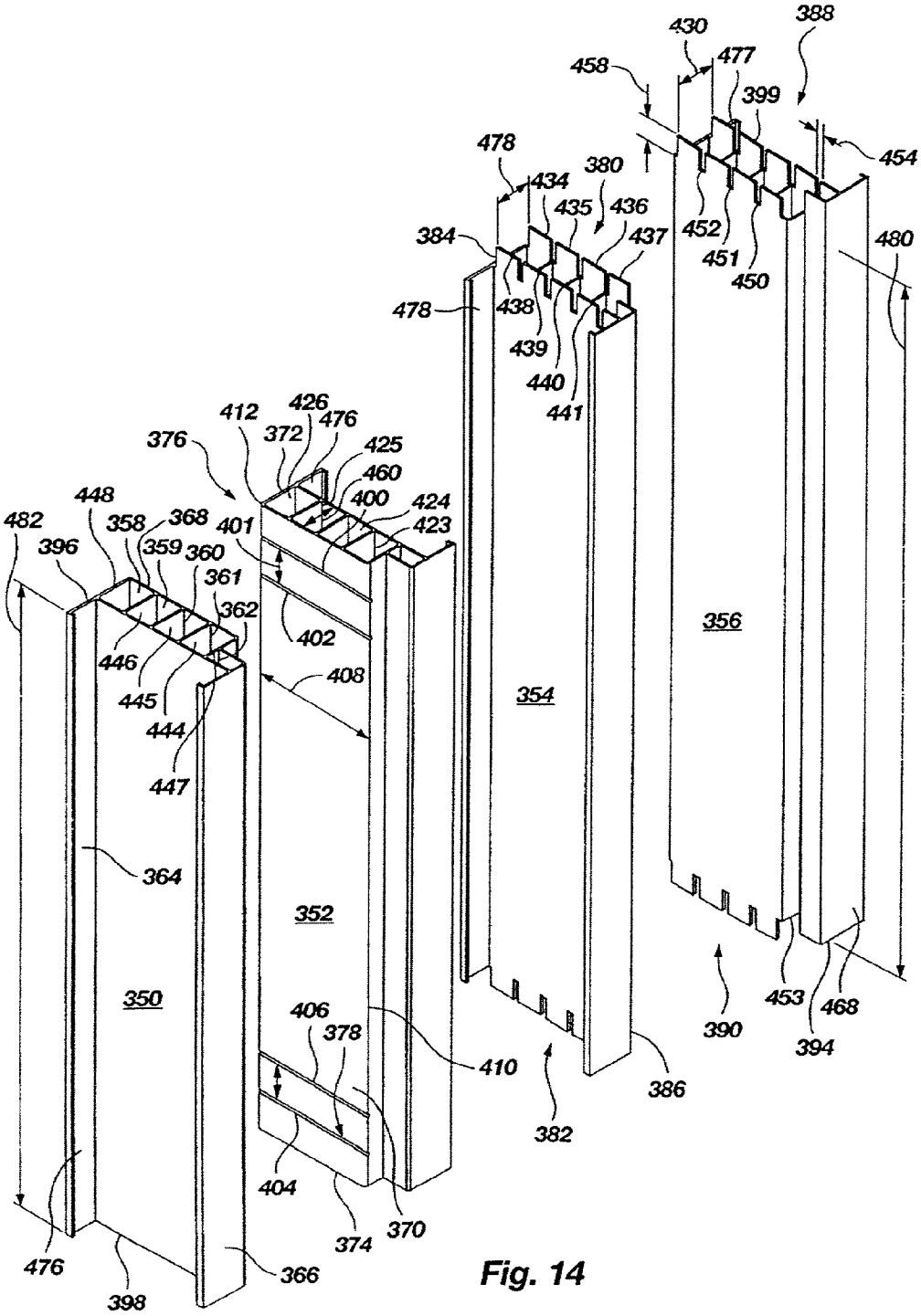
FIG. 14 is a perspective view of side members suitable for use in forming a window buck of the present invention.
Figure 15:
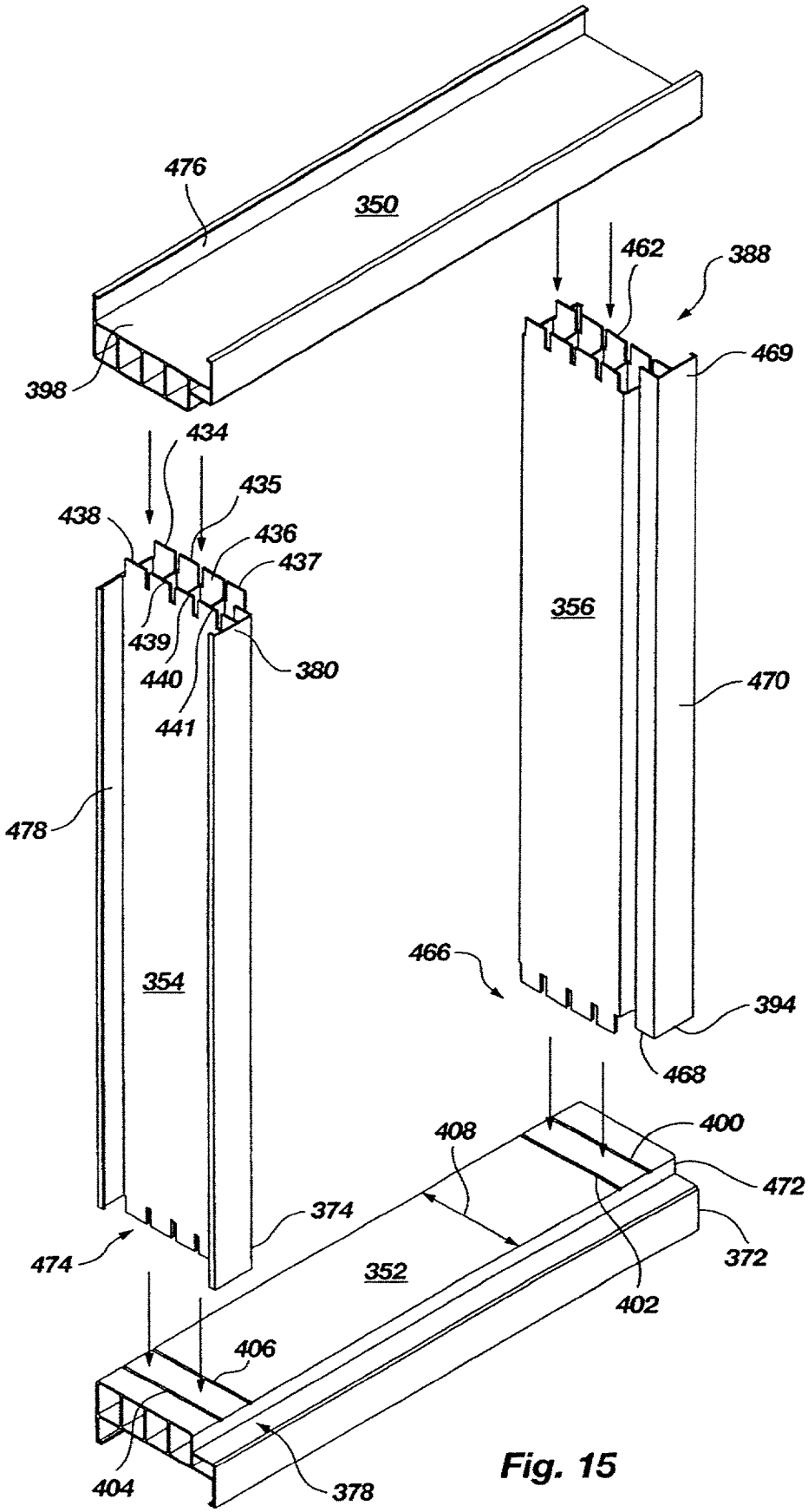
FIG. 15 is a perspective view of the side members of FIG. 14 positioned for assembly into a window buck of the present invention.
Figure 16:
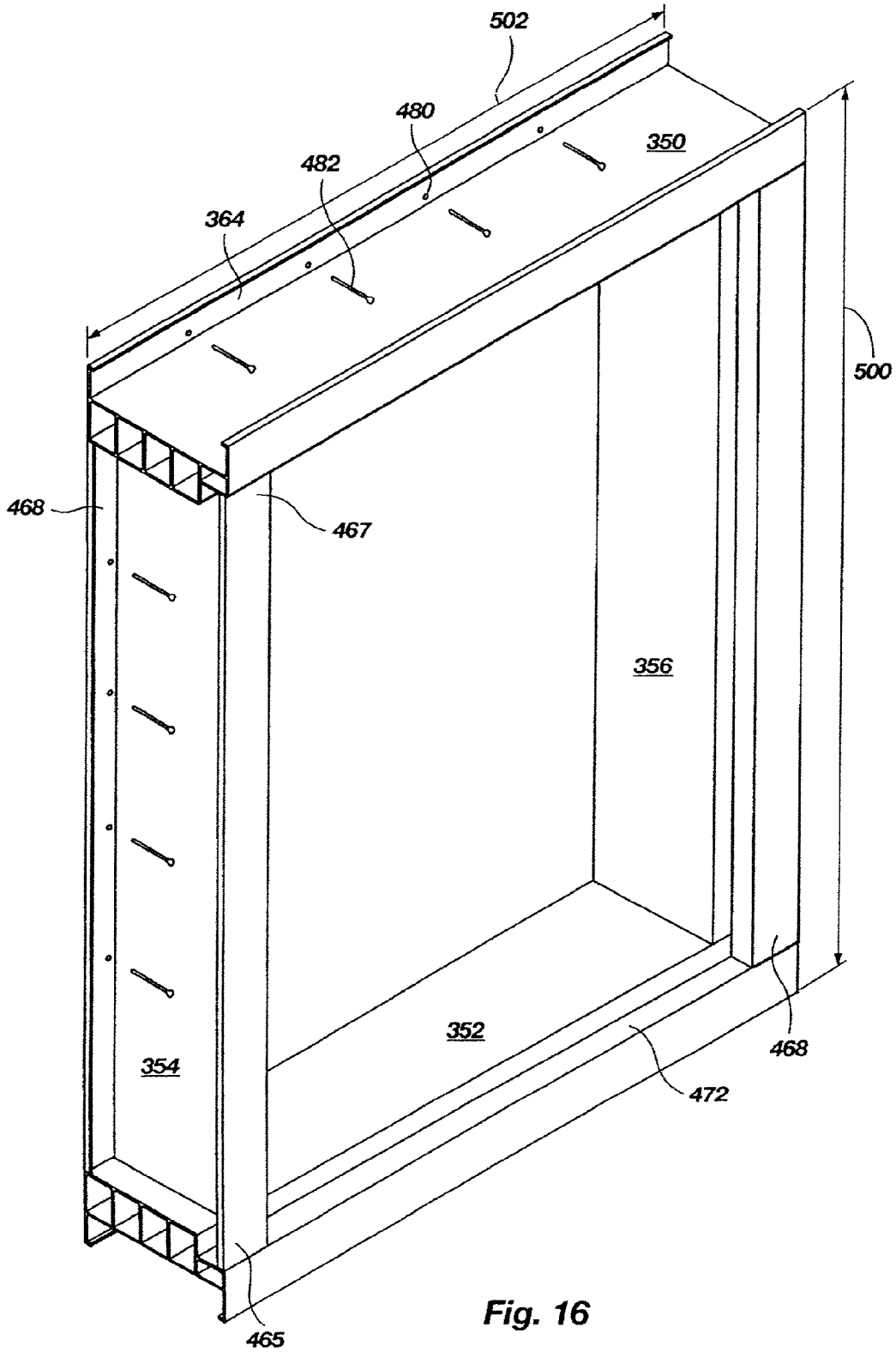
FIG. 16 is a perspective view of the side members of FIG. 24 assembled into a window buck of the present invention.

In FIGS. 14–16, four side members 350, 352, 354 and 356 are shown. Each side member such as side member 350 has a plurality of side-by-side channels such as channels 358, 359, 360, 361 and 362 for side members 350. The channels 358–362 are similar to those described in more detail in FIGS. 2, 3, 8 and 9. Each side member such as side member 350 also has an exterior flange 364 and an interior flange 366 comparable to the flanges or extensions 72 and 82 in FIG. 2, extensions 134 and 132 in FIG. 3 and extensions 220 and 238 shown in FIG. 8.

In FIG. 14, it can be seen that side members 350 and 352 are virtually identical and are oriented and differ only in that they each have an interior surface 368 and 370 which are facing each other. As best seen with respect to the side member 352, first end 372 and the second end 374 are both formed to be substantially the same. That is, each are here shown to have connecting means which is female structure 376 and 378 configured to connect with male structure 380 and 382 positioned at the first end 384 and the second end 386 of side member 354 or male structure 388 and 390 associated with the first end 392 and the second end 394 of the side member 356. The female structure is associated with both ends 396 and 398 of the side member 350. However, the female structure of the side member 350 cannot readily been seen because of the orientation of the side member 350 in the illustration of FIG. 14.

The female structure 376 and 378 shown for the side member 352 includes a first groove 400 and a second groove 402. Similarly, the other female structure 378 contains a first groove 404 and a second groove 406. The grooves 400, 402, 404 and 406 each extend the complete width 408 of the interior surface 370 of the side member 351 That is, they extend from the edge 410 to the edge 412.

Figure 17:
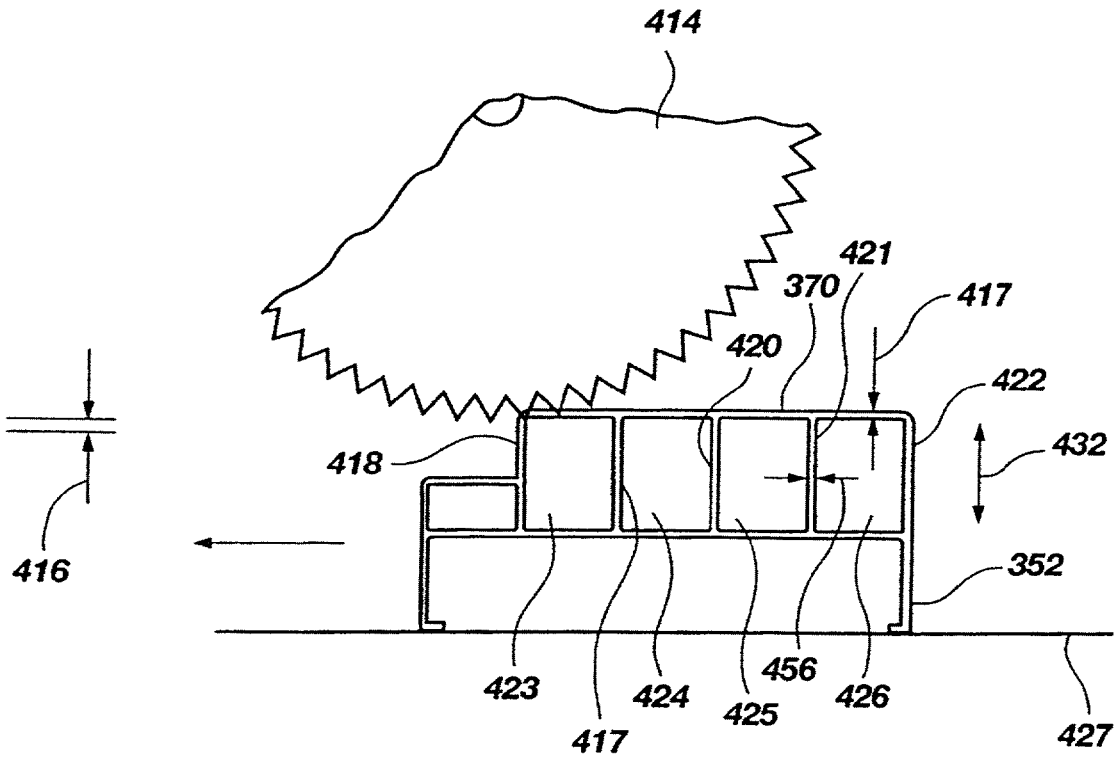
FIG. 17 is a simplified illustration of a saw used in the formation of side members used with window bucks of the present invention.

In practice, the groove 400, 402, 404 and 406 are formed as seen in FIG. 17. That is, a saw blade 414 is shown positioned to cut a groove in the interior surface 370. The associated drive mechanism for operating the saw blade in a conventional manner is not illustrated for purposes of simplicity. Any convenient table saw or radial arm saw will be suitable for achieving the purposes as hereinafter described. Mechanisms other than saws may be used including grinding wheels and friction discs to create a groove in a vinyl material or other material used to fabricate the side members 350, 352, 354 and 356.

In FIG. 17, the saw blade 414 is shown cutting a groove which is of a selected depth 416. The depth 416 is selected to be more than the thickness 417 of the interior surface 370 of the member 352. Thus the groove 400 as well as other grooves 402, 404 and 406 can all be formed so that individual slots are defined by the channel walls 418, 419, 420, 421 and 422 to provide access to the interior of each of the plurality of channels such as channels 423–426. The groove, such as grooves 400, 402, 404 and 406, is formed by moving the side member 352 on a saw table top 427 as the saw blade 414 rotates to make the cut.

It can be seen that a saw can be devised in which two or four blades are operating so two or four grooves 400, 402, 404 and 406 can be formed simultaneously with one movement of the side member 352.

The grooves such as groove 400 and 402 are spaced apart a distance 401 which is the same as the distance 428 which in effect the height 432 of each of the channels of each of the side members such as channels 423–426 in side member 352.

In reference to the side members 354 and 356, it can be seen that each has tongue structure which is a plurality of tabs or tongues 434, 435, 436, 437, 438, 439, 440 and 441. The tabs 434–441 are formed by using a saw blade such as saw blade 414 and cutting grooves which coincide with the interior sidewalls such as interior sidewalls 444, 445 and 446 shown for the channels 358–362 for side member 350. More specifically, the tongues 434–441 are formed by making cuts which remove the interior sidewalls such as sidewall 444–446 as well as the sidewalls 447 and 448 down a distance selected to form tongues 434–441. The saw blade creates a slot or groove such as slot 450, 451, 452. The slots 450–452 have a width 454 which is defined by the width of the saw blade 414 which also coincides with and is slightly more than the width 456 of the interior sidewall 444–446 as well as sidewalls 448 and 447.

The tongues 434–441 each are cut to a depth 458 which is less than the depth 460 of each of the channels such as channels 358–361.

As seen in FIG. 15, the side member 350 is oriented with its slots in the first end 396 (not shown) to register with the male structure 388 and more particularly the plurality of spaced-apart tongues 462 formed in the first end 392 of the member 356. Similarly the slots not shown in the second end 398 of the side member 350 register with plurality of tongues 437–441 formed in the first end 384 of the side member 354. Similarly, the plurality of tongues 466 in the second end 394 of the side member 356 are positioned to register with the slots 400 and 402 at the first end 372 of side member 352. It may also be noted that the slot 453 (FIG. 14) creates an extension 468 so that a snug fit of the extension 468 is effected in the window receiving groove 472 as better seen in FIG. 16. A similar extension 469 is formed at the first end 390 of side member 356. Similar extensions 467 and 465 are formed in side member 354 as illustrated.

In FIG. 15, the second end 374 of the side member 354 has male structure 382 in the form of tongue structure 474 that registers with the grooves 404 and 406. The male structure 382 of the first end 384 registers with the female structure (not shown) in the first end 396 of the side member 350.

Since the saw blade 414 is selected to have substantially the same width as the thickness of the interior surface 370 of a side member and the interior sidewalls such as sidewalls 444–446 of the channels 358–361, it can be understood that a snug fit is effected between the tongues such as tongues 434–441 and the corresponding slots such as slots 400, 402, 404 and 406.

In some instances, a user may add a glue such as an epoxy resin or other similar material in order to enhance or strengthen the connection if desired.

As can be seen in FIG. 16, the side members 350, 352, 354 and 356 are assembled to form a rectangular-shaped window buck. It can be seen that the exterior flanges 364, 476, 477 and 478 are shown with a plurality of dots 480 to illustrate scribes or apertures through which screws or nails may be inserted to secure the window buck shown in FIG. 16 to the wall of an associated form or one of a pair of forms used to define a cement wall. Nails such as a nail 482 may be driven through one or more of the apertures 480 or through the flanges 364, 476, 477 and 478 at any desired location. The window buck, though particularly useful and suitable for use with cement walls may also be used in wooden wall construction in selected, desired applications.

To install a window buck such as that shown in FIG. 16, the cement forms such as forms 79 and 81 in FIG. 2 are first provided. Preferably one form, such as form 79, is installed and positioned. The window buck such as that shown in FIG. 16 is positioned on the wall at a desired location and secured in place by nails such as nails 482. Alternately, other fasteners including glues or anything else to maintain a secure relationship may be employed. Alternately, the buck may be supported by a rebar structure positioned under it.

The other portion of the cement form 81 is then positioned in place and secured. Thereupon cement is poured into the form to define and create the cement wall. The cement is poured around and then over the window buck. Once the cement cures or dries, the form such as forms 79 and 81 are removed leaving an erect wall with a window buck defining a window opening. Thereupon a window such as window 20 may be inserted into the window groove 472 (FIG. 16).

It may be also noted that the use of two sets of tongues 434–437 and 438–441 to associate with corresponding grooves such as grooves 400 and 402 effect a more stable, rigid relationship to facilitate installation. That is, one side such as side member 356 could be associated and connected with side member 352. The double slot and double groove arrangement provide for more stable connections so that the assembly remains freestanding while the user continues to assemble the other sides such as side 350 and 354.

It may be noted with particularity that the window buck of FIG. 16 is formed using two identical members 350 and 352 which have female structure such as female structure 376 and 378 formed at their opposite ends. Similarly the other side members 354 and 356 are identical and have corresponding male structure 380 and 382 as well as 388 and 390 formed at their respective opposite ends.

In operation, a user may find it convenient to collect side members of different sizes in a single collection. That is, a collection of side members such as side member 354 of a particular size may be stored next to a collection of side members such as side members 350 and 352. Next to that, another series of side members having height or length 480 that differs from the height or length of members 350, 352, 354 and 356 may be provided. Similarly, additional side members having other lengths or heights 482 (FIG. 14) may be provided in yet another adjoining storage location.

Thus, a user may be able to quickly assemble window bucks of different dimensions by simply collecting a pair of side members having female structure and a pair of side members having male structure. Window bucks of different sizes may be quickly and easily assembled by simply assembling the desired side members to effect assembly of a window bucks having different desired heights and widths.

By way of example, one could assume that one desired window buck would have a height 500 of two feet and a width 502 of two feet. Mother window buck would have a height 500 of two feet and a width 502 of three feet.

It can also be seen that side members which may be regarded as female side members such as side member 350 and 352 may be separately collected (e.g., on a pallet or in a bin) having a width 502 of two feet. Another group of side members similar in shape and form to those 350 and 352 having a width of three feet may be separately assembled in an adjoining or nearby location. Further, a number of side members such as side members 354 and 356 having a height of two feet may be in another nearby location. Thus, to assemble a window buck having a height of two feet and a width of two feet, one need only assemble two female members having a width 502 of two feet and two male members having a height 500 of two feet in order to have a window buck that is two feet by two feet.

To have a window buck that is two feet by three feet, the user need assembly only two side members of two foot height and two female members such as members 350 and 352 having a width of three feet. Similarly, if a user desired a window having, for example, a width 502 of three feet and a height 500 of three feet, a user could then go to a separate nearby location to acquire two side members such as side members 354 and 356 having a height of three feet combining the side members that are three feet in height with the side members are three feet in width 502 produces a three foot by three foot window buck.

The above-referenced dimensions are purely theoretical and are not intended to in fact reflect what the standardized size may be for given standardized windows. However, the sizes do illustrate the fact that different sizes of different window bucks may be assembled by simply assembling side members having the desired widths and heights to define the desired window openings. In turn, the number of overall side members that need to be inventoried can be reduced or controlled not only by the manufacturer, but also by the distributor as well as by the customer.

Figure 18:
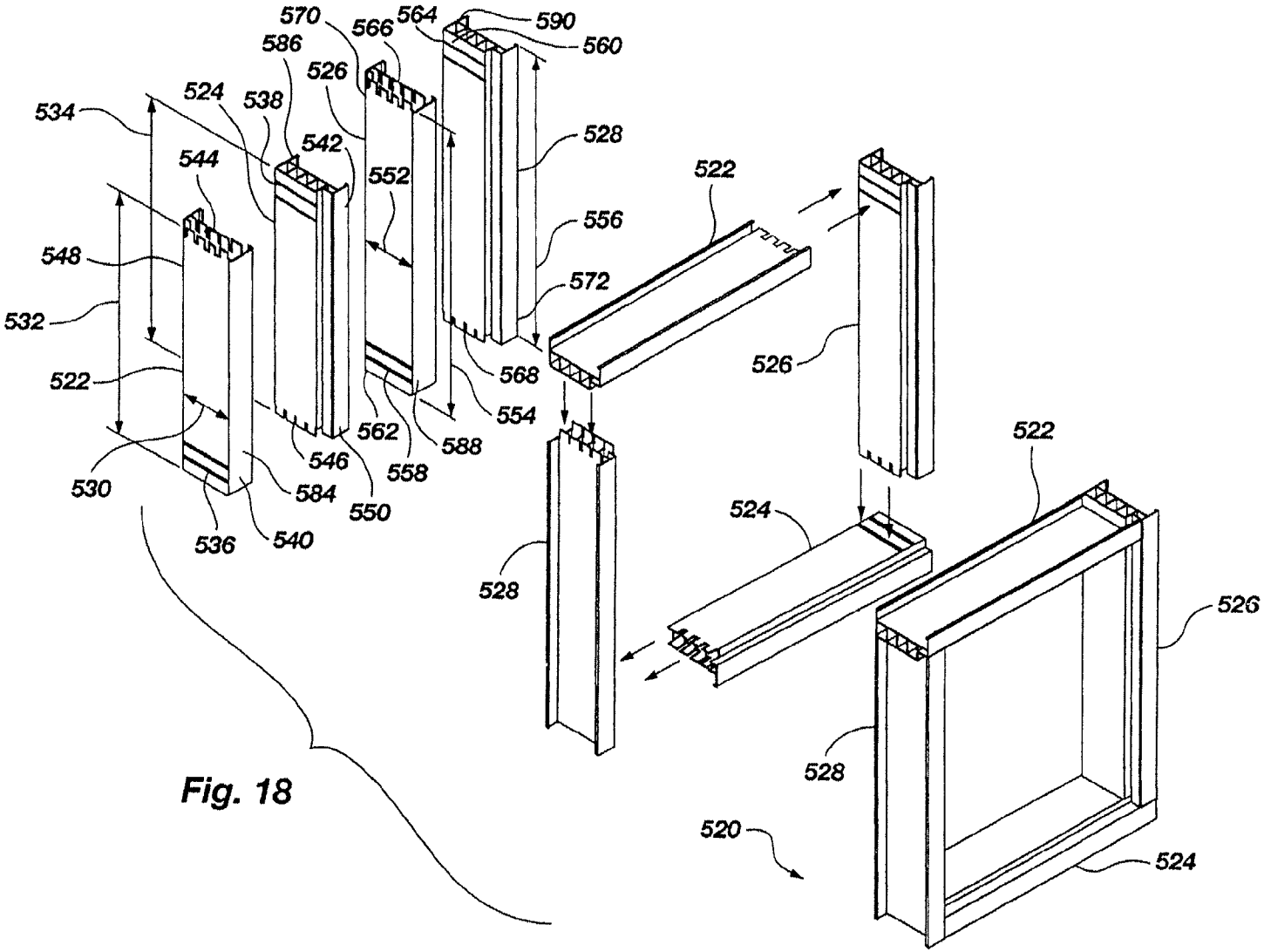
FIG. 18 is a simplified perspective illustration depicting the steps for assembling a window buck of the present invention.

Turning now to FIG. 18, a preferred window buck 520 is depicted being formed by the assembly of a pair of identical first side members 522 and 524 and a pair of identical second side members 526 and 528, the first side members 522 and 524 have the same width 530 as well as the same lengths 532 and 534. The first side members 522 and 524 also have slot structure 536 and 538 formed in their respective first ends 540 and 542. Of course, they also have tongue structures 544 and 546 formed in their respective second ends 548 and 550.

The pair of second side members 526 and 528 also have the same width 552 which is the same as the width 530 of the pair of first side members 522 and 524. The second side members also have the same lengths 554 and 556 which may be the same as or different from the lengths 532 and 534. The second side members 526 and 528 also have slot structures 558 and 560 formed in their first ends 562 and 564 as well as tongue structures 566 and 568 formed in their respective second ends 570 and 572.

With the first side members 522 and 524 and the second side members 526 and 528 configured, as described, it can be seen that end-to-end assembly can be effected as depicted. End-to-end assembly results in the fully assembled window buck 520.

Because the first side members 522 and 524 are the same and because the second side members 526 and 528 are the same, the user need only have two stock piles or bins rather than four. That is, the user need have only a first stock pile or bin for first side members and a second stock pile or bin for second side members. An additional stock pile or bin may contain third side members all of which are identical to each other so that window bucks of different dimensions may easily be assembled using either the first side members or second side members with the third side members.

Figure 19:
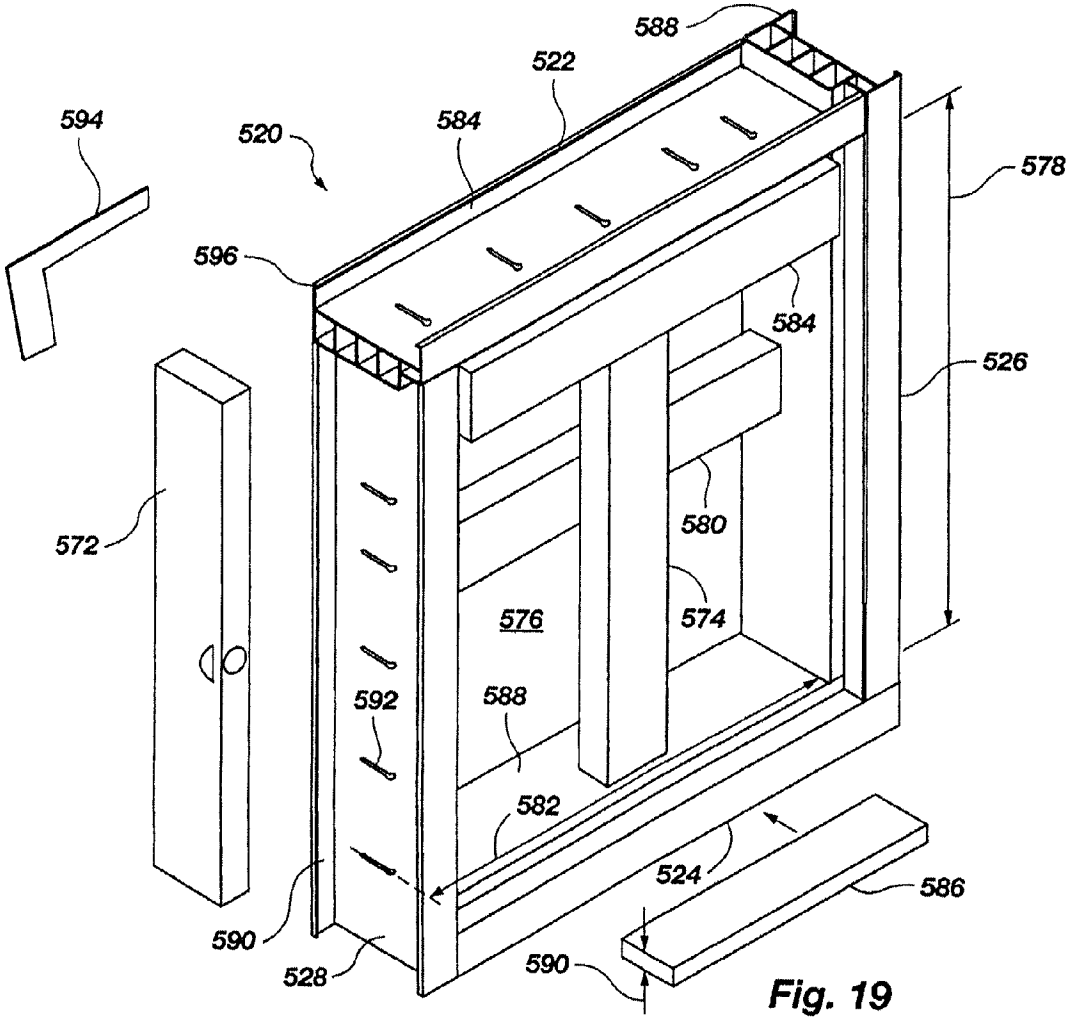
FIG. 19 is a perspective illustration of a window buck of the present invention with cross braces.

FIG. 19 shows an assembled window buck 520 with a first brace 574 positioned in the interior 576 defined by the first side members 522 and 524 and the second side members 526 and 528. The first brace 574 has a length 578 which is essentially the same as the height of the interior 576. The first brace 574 in place stiffens or strengthens the window buck 520 to inhibit collapse during assembly and to inhibit deformation during installation and during formation of the associated wall.

A second brace 580 is also shown extending the width 582 of the interior 576 to stiffen or strengthen the window buck 520 during installation and during formation of the associated wall. A third brace 584 may also be provided. The third brace 584 is sized the same as brace 580 and may be desired to strengthen the window buck to assist in resisting twisting forces that may evolve during installation and during formation of the associated wall. For example, cement may be poured unevenly and stress the window buck 520 as the cement flows thereabout.

FIG. 19 also shows a shim 586 that may be placed between one interior surface 588 and the first brace 574. The first brace would necessarily be shorter in length 578 to accommodate the thickness 590 of the shim 586.

After formation of the wall in which the window buck 520 is placed, the stress or compression force on the first brace 574 may be quite high so that the first brace may need to be removed by use of force. In so doing, the surface 588 could become scratched or otherwise damaged. The shim 586 limits or avoids such damage from the first brace 574. Of course, a similar shim may be used for the other braces 580 and 584.

FIG. 19 also shows the fasteners 592 spaced about the perimeter of the window buck 520 for positioning through the exterior flanges, such as flanges 584, 586 (FIGS. 18), 588 and 590, of the side members 522, 524, 526 and 528.

In FIG. 19, a carpenter's level 592 is shown to illustrate that in the process of assembling the window buck 520, a level 592 is useful to ensure installation of the window buck 520 with a level or horizontal orientation of the interior surface 588 as well as a vertical orientation of the side members 526 and 528. Of course, a carpenter's square 594 may be used in assembling the window buck 520 to ensure the corners, such as corner 596, are truly square or normal.

The embodiments of FIGS. 8 to 18 are preferred because they do not require use of a separate locking member to form the corners of a rectilinear window buck or to connect the ends of a side member or side members to form a desired window buck. Thus in use, a window buck of desired dimensions may be packaged to contain two female side members and two male side members.

It should be recognized that the window buck of FIGS. 1–18 provides for simple transportation inasmuch as it need not be pre-assembled. Rather, it may be shipped disassembled with its components shrink-wrapped together or otherwise packaged to contain the various side members with or without locking members. Upon arrival of the package at the construction site, the window buck components may be unpackaged and easily assembled at the time of installation. Damage while in storage and before use at the site is thereby minimized. Thereafter, the window buck may be easily placed in between the forms that are then positioned to form the cement wall so that upon pouring the cement wall, the window buck is in position to make further window construction simple and easy.

Figure 20:
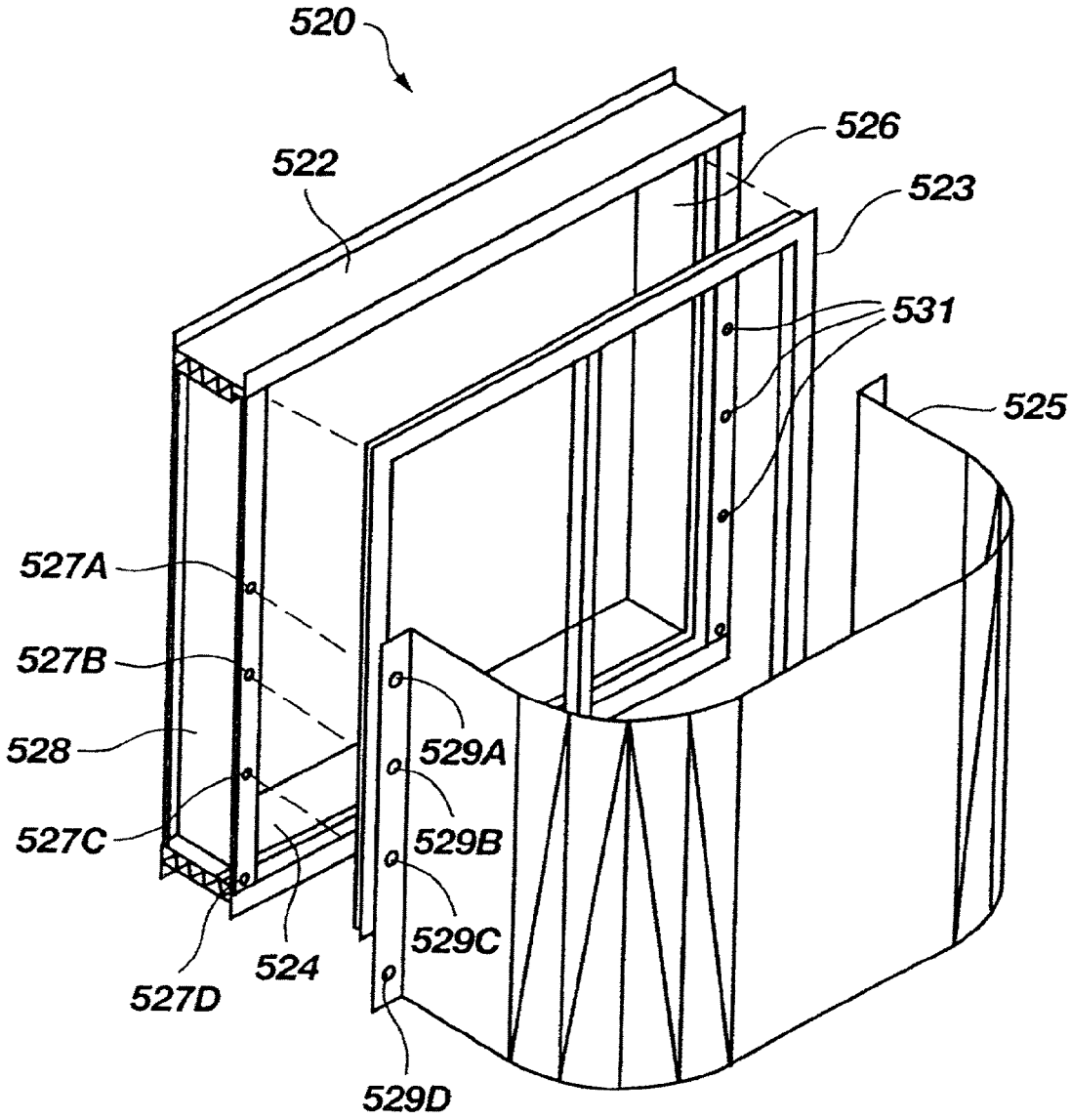
FIG. 20 is a perspective illustration of the window buck of FIG. 19 with a window frame positioned for insertion and a window well cover positioned for attachment to the widow buck.

FIG. 20 is a perspective view of the window buck 520 of FIG. 19 having side members 522, 524, 526 and 528 assembled as shown. A window frame 523 is show positioned for insertion into the window buck 520 to complete formation of a window. A separate window well enclosure 525 is also show. It has a plurality of eye shaped openings such as openings 529A–D positioned to interconnect with headed fasteners (e.g., nails, screws, rivets, or the like) 527 !-D secured to the side member 528. Corresponding fasteners 531 are associated with side member 526 to interconnect with openings (not shown) in the window well enclosure 525. Thus following assembly of the window 523 into the window buck 520, the window well enclosure 525 may be attached for those windows that will be at or below ground level.

Figure 21:
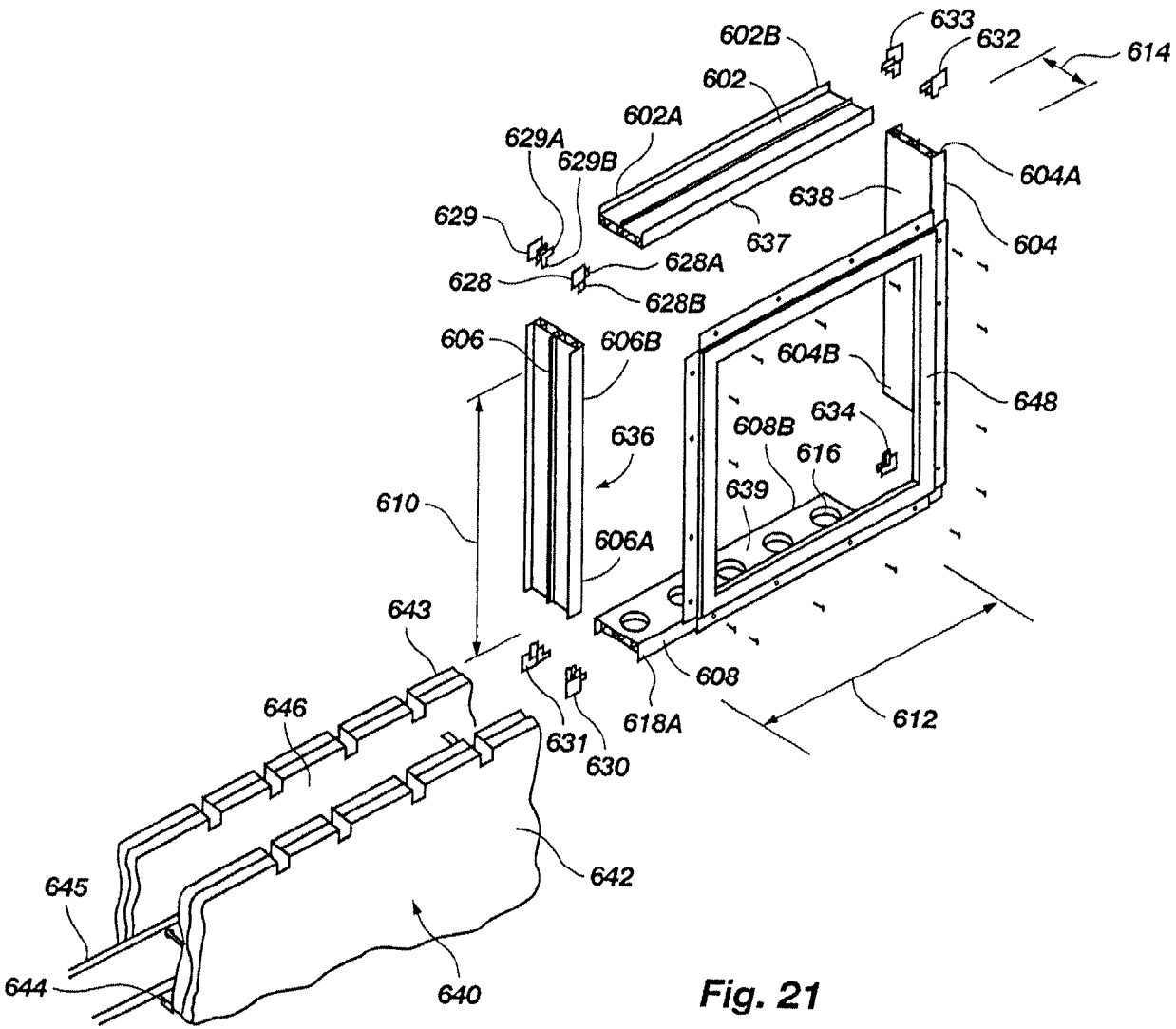
FIG. 21 is an exploded perspective of a preferred alternate embodiment of a frame for use in openings in a structural wall with a window and with a partial view of an insulated concrete form.

An alternate frame arrangement is shown in FIG. 21. A frame and more particularly a window buck 600 is shown having a top side member 602, a right side member 604, a left side member 606 and a bottom side member. When assembled, the window buck 600 will have a height 610 and a width 612 which may be any desired height and width for an opening in a structural wall to be formed from concrete.

The top side member 602, the tight side member 604 and the left side member 606 are all formed from stock. That is, side member material may be provided in standard lengths as desired ranging from six foot to sixteen feet. At present the sixteen foot dimension appears to be preferred and because it is comparable in length to other building materials and in turn is transportable by trucks sized to transport other building materials. The stock also comes in different widths 614 such as for example, four inch, six inch, eight inch, ten inch and twelve inch. Upon obtaining the desired stock, the user cuts the tops side member 602, the left side member 606 and the right side member 604 using any suitable tool. A hand saw will work although it is expected that a hand held portable circular saw or other suitable saw will be used.

A bottom stock is separately provided. As can be seen the bottom side member 608 is formed with apertures 616 spaced along its length. The bottom stock is provided in lengths and widths comparable into the stock used to form the other side members. Upon selection of the proper stock for the bottom side member, it too is cut to the desired length in the same manner as the other side members 602,604, 606 to form the bottom of the window buck 600.

Figure 22:
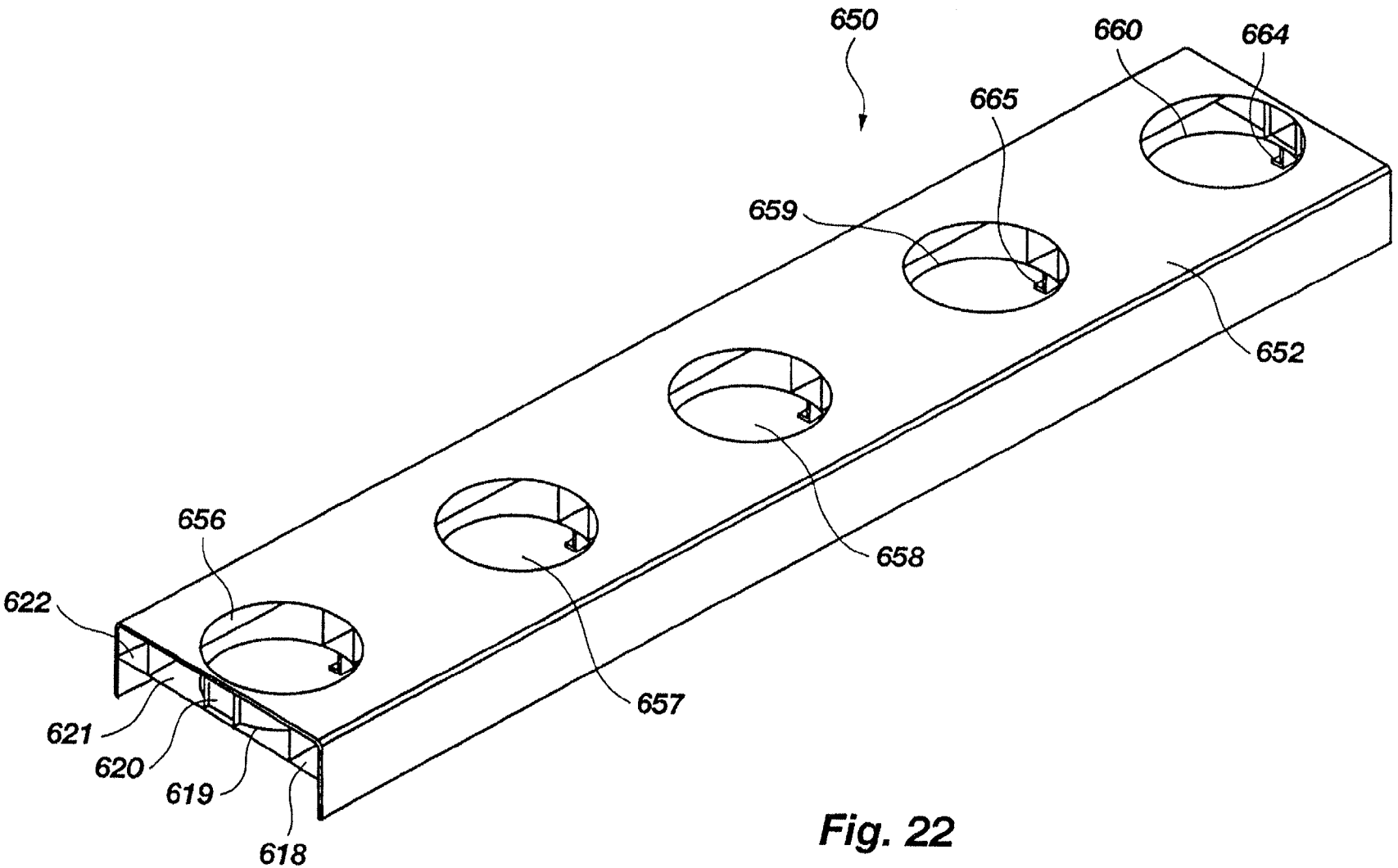
FIGS. 22 and 23 are perspective views of a bottom side member.
Figure 23:
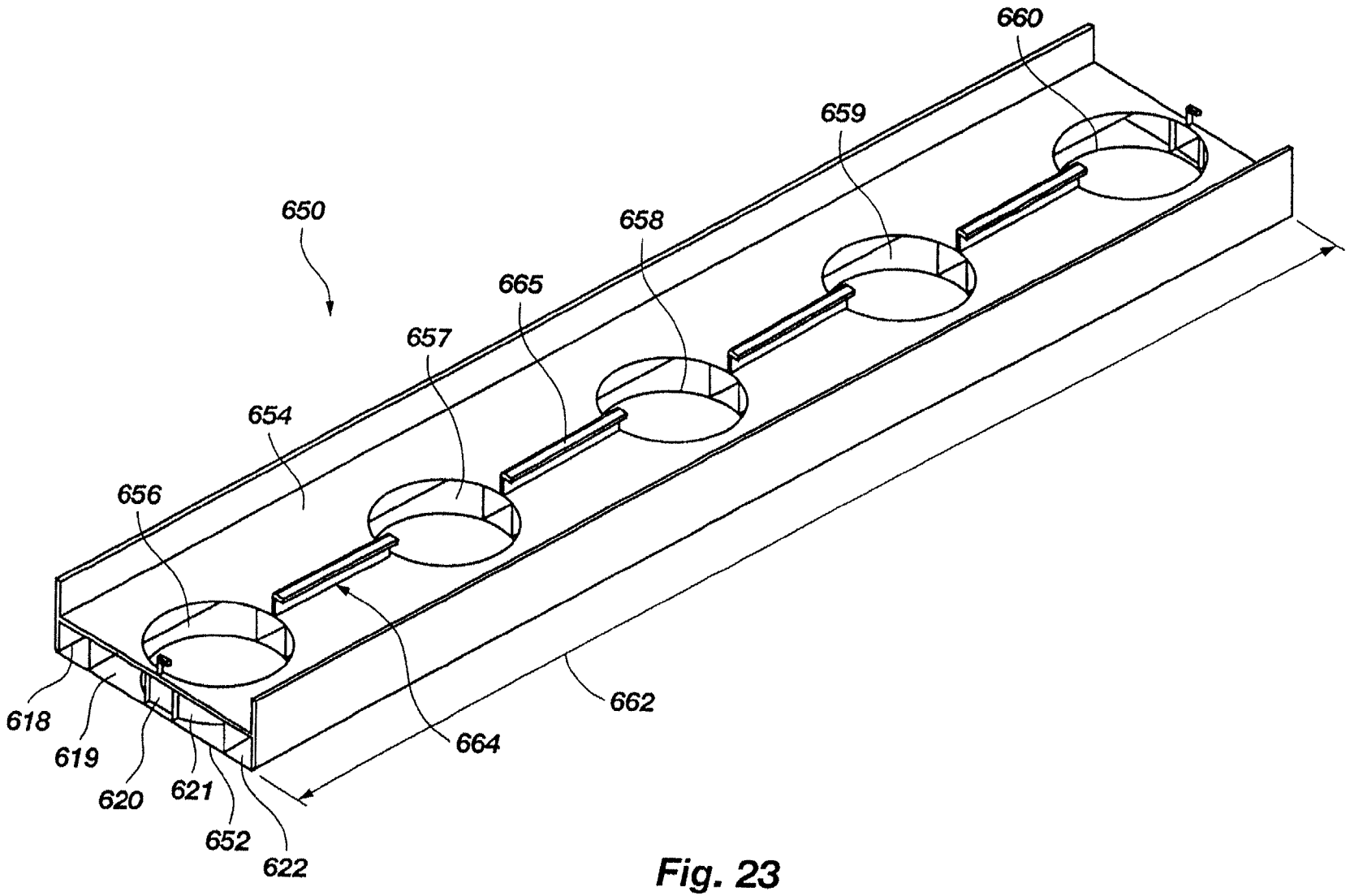
Figure 24:
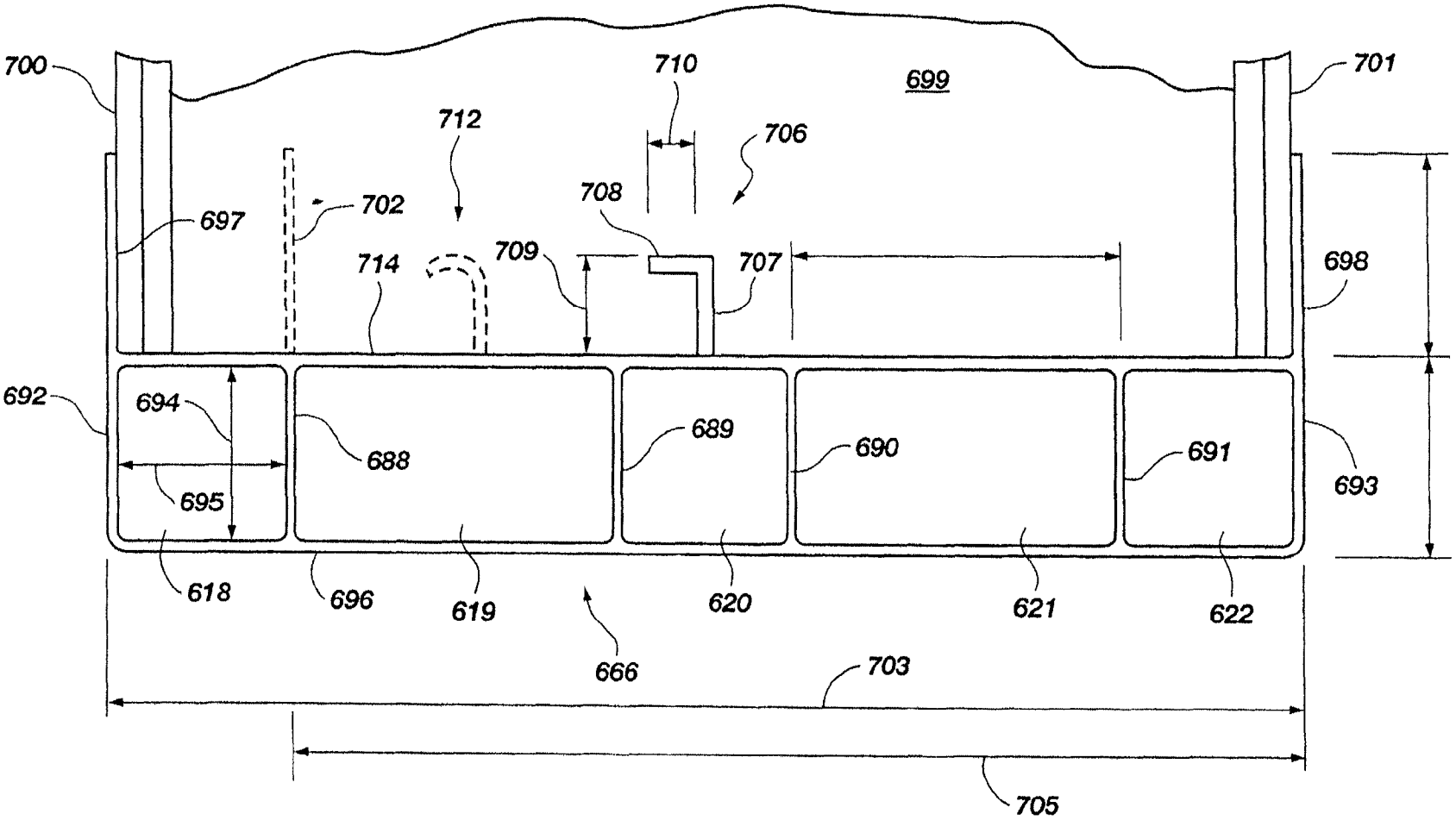
FIG. 24 is a cross section of a side member for use with and in the present invention.

The each side member 602, 604, 606 and 608 of the window buck 600 is formed with a plurality of channels 618–622 as seen more clearly in FIGS. 22, 23 and 24 and as more fully discussed with respect thereto. Top side member 602 has opposite ends 602A and 602 B. Similarly left side member 606 has opposite ends 606A and 606 B. Right side member 604 has opposite ends 604 A and 604 B. Similarly the bottom side member 608 has opposite ends 608 A and 608 B. As can be seen in FIG. 21, an opposite end of one side member is positioned for connection to an opposite end of an adjacent side member so that the widow buck may be formed. The opposite ends are connected by connection means such as connectors 631, 632, 633 and 634 as well as connector 635 which is not shown here. The connectors each have a first finger or extension such as extensions 628 A and 629A sized to frictionally and slidably engage the outer channels 618 and 620 in the respective side members. A second finger or extension such as extensions 628B and 629B are similarly sized to engage the outer channels 618 and 622 of adjacent side members. Although two connectors such as connectors 628 and 629 are shown for connecting one side member to the adjacent side member, it should be understood that more than two connectors can also be used as desired. Two have been found to be suitable to reduce twisting and to maintain alignment of the various inner walls 636–639 of the side members 602–608

The connectors shown effect a frictional lock. It should be understood that the connectors may be glued, welded, chemically adhered and taped. In other words, any fastening arrangement is acceptable so long is it results in connection of one side member to the adjacent sufficient to retain a fixed relationship during the pouring and curing of the concrete wall.

After the window buck 600 is assembled, it is placed so that a desired opening is formed when a concrete wall is formed. As shown in FIG. 21, an insulated concrete form has two spaced apart wall members 642 and 643 assembled to define the void 46. Each side 642 and 643 is held in relationship to each other by conventional means including spacers 644. Rebar 645 may be placed in the wall to strengthen the wall when it is formed.

The window buck 600 is placed into an opening cut into the insulated concrete form 640 and physically secured in the form by any acceptable means such as by nails. With the wall forms otherwise ready, concrete is poured into the void 646. In the vicinity of the window buck 600, concrete may be poured into the apertures 616 to ensure the delivery of concrete to the void space under the window. The apertures 616 also vent any air from under the window buck 600.

After installation, the window buck may be braced as more fully discussed herein.

After the concrete is poured and cured, the bracing if any is removed and a window such as window 648 is installed in the window buck 600. The window 648 may be secured in place by any acceptable means including an acceptable adhesive, nails, screws and the like.

FIG. 22 shows a bottom member 650 with its internal wall 652 facing upward. FIG. 23 shows the bottom member 65 0 with its internal wall 652 facing downward and with the external wall 654 spaced from the internal wall 652 and facing into the void such as void 64. The channels 618–622 are also shown. Apertures 656–660 are shown spaced apart along the length 662 of the member 650. The apertures 656–660 are sized to be receive concrete therethrough. Any acceptable funnel, chute or the like may be aligned with the apertures 656–660 to direct concrete therethrough. In cases where concrete is being pumped, it has been noted that the output end of the house is typically less than about four and one half inches. Thus the apertures 656–660 are shown sized to be circular in cross section with a diameter of about five inches.

The bottom member 650 also has concrete retention means which is here shown as a fin 664 that extends along the length 662 of the bottom member 650. The fin 664 has a lip 665 oriented transversely to interconnect with the concrete after the wall is formed as more fully discussed hereinafter.

Referring now to FIG. 24, a side member 666 such as side members 602, 604, 606 and 608 is shown in cross section. The side member 666 has the plurality of channels 618–622 as hereinbefore discussed. The channels 618–622 are formed by sidewalls 688–691 as well as the outer sides 692 and 693. The additional sidewalls may be used to form additional channels as desired. Fewer sidewalls may be used so that fewer channels are formed. However, at least one sidewall is regarded as necessary to provide desired structural rigidity in use. Further, the channels also function to resist heat transfer. Of course they may also be filled with insulating material if desired.

As here shown the outer channels 618 and 622 are formed to have a height 694 and width 695 selected to frictionally receive a connector as more fully discussed hereinafter.

The outer sides 692 and 693 extend away from the inner wall 696 to form flanges 697 and 698. The flanges 697 and 693 have the wall 699 thereinbetween. More specifically, the sides 700 and 701 of an insulated concrete form is shown with the flanges 697 and 698 in alignment therewith. Prior to pouring of the concrete, flanges 697 and 698 act to retain the side members and in turn the frame with which they are associated in position. After the wall 699 hardens or cures, the flanges 697 and 698 provide a surface to which one may attach other building elements and a surface that has an acceptable surface that does not require preservation or decoration.

In FIG. 24, an additional flange 702 is shown in phantom. In some cases, it is contemplated that multiple flanges will be, provided so that one may cut (rip) one channel off to form a side members with a widths 703 and 705 that differ. In FIG. 24, a retention fin 706 is shown formed of an extension 707 and a lip 708. The extension 707 has a height 709 selected so that the retention member is positioned securely in the poured concrete of the wall 699. In practice, it has been found that the height may be from about one half an inch to several inches. At present nine sixteenths of an inch has been found to be suitable. However, any height will be suitable so long as the fin 706 is firmly anchored int the wall 699 when the concrete cures or hardens.

The lip 708 is shown to have a width 710. The width may be any desired width to secure the or anchor the fin 706 in the wall 699. It may be from about one fourth of an inch to several inches. At present a width 710 of seven sixteenths of an inch has been found to be suitable and adequate.

It should be noted that the fin 706 is shown to be "L" shaped in cross section. Other shapes or configurations may be used. That is, the lip 708 is simply one means to effect an anchoring of the related side member to the wall without the need to use fasteners such as nails, bolts, screws or the like. Upon curing of the concrete, the side members are secured firmly. Alternated shapes for the anchoring effected by the lip may be used. A separate fin 712 is shown with a hook like anchoring arrangement. Virtually any shape or configuration of anchoring may be used in lieu of the lip 708 so long as the effect is to preclude outward movement of the outer wall 714 from the wall 699. It may also be noted that multiple fins may be used if desired.

Figure 25:
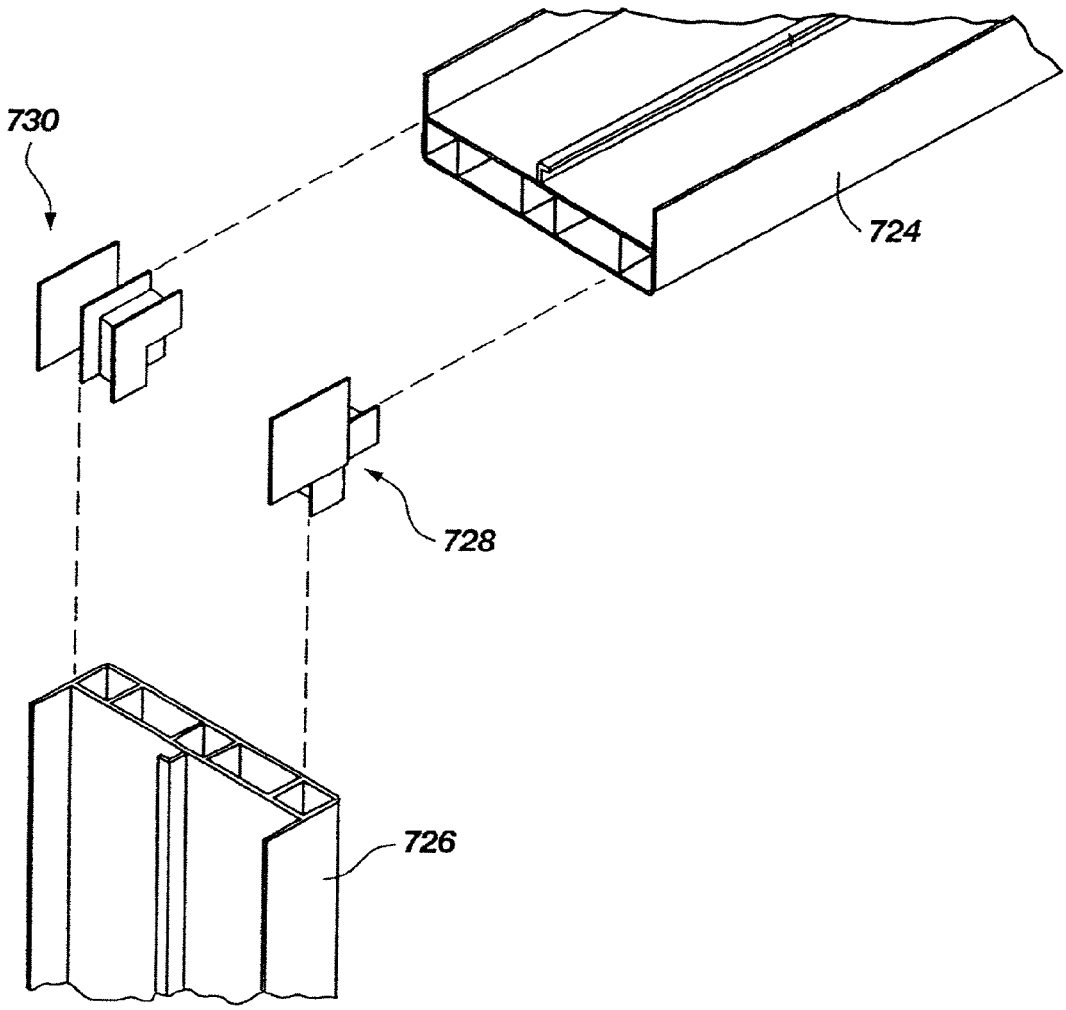
FIG. 25 is a partial perspective exploded view of two adjacent side members and a connector of the invention.
Figure 26:
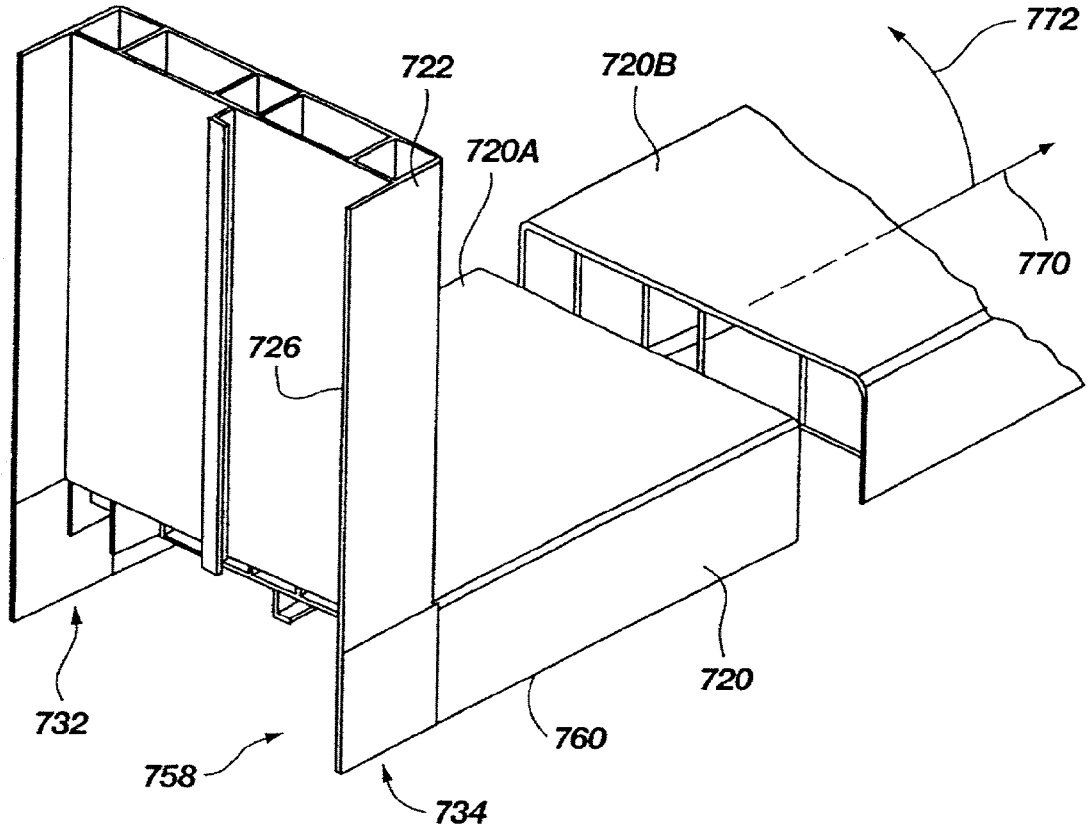
FIG. 26 is a partial perspective view of two adjacent side members connected together and a side member in section.

FIGS. 25 and 26 show adjacent side members 720 and 722 as well as side member 724 and 726 comparable to side members 602, 604, 606, and 608 in FIG. 21. The connectors 728, 730, 732 and 734 are comparable to the connectors 628–635 all of which are comparable to connector 736 show in FIG. 27. As better seen in FIG. 27, a connector 736 has first male structure such as finger 738 sized to frictionally insert into a selected channel such as outer channels 618 and 622. The finger 738 is here shown to be in the form of an "I" 740 in cross section to reduce the material and to allow some flexibility when inserting the finger 738 into a selected channel. The finger 738 has a height 739 and a width 737 sized comparable to height 694 and width 695 (FIG. 24) to effect a frictional but slidable engagement with a channel such as channel 618. In some embodiments the finger 738 will have rounded or beveled corners 741, 742 and 743 as shown by dotted line. The rounded or beveled corners will facilitate insertion of the finger 738 into a channel such as channel 618.

Figure 27:
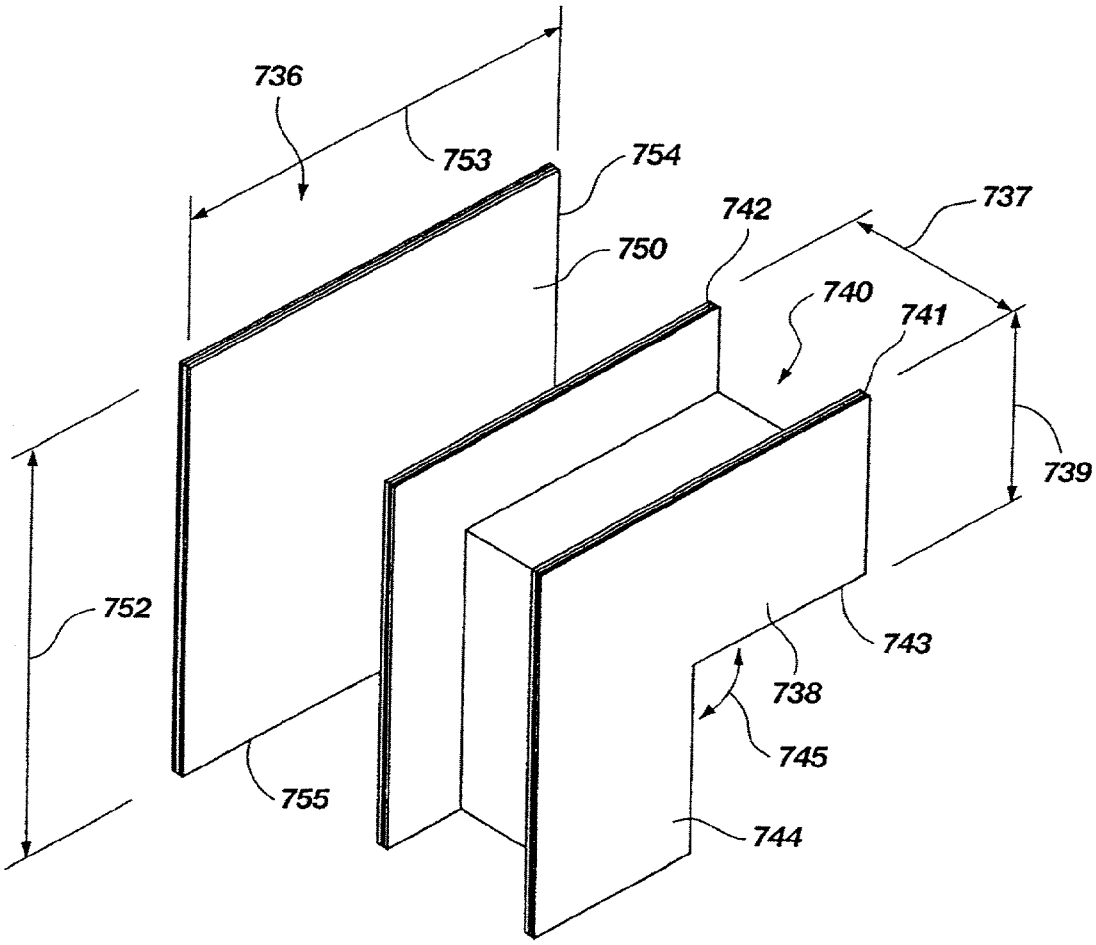
FIG. 27 is a perspective view of a connector for use with the present invention.

In FIG. 27 the second male structure is a second finger 744 formed identically to the finger 738 and unitarily therewith to extend away at a 90 degree angle 745. A filler plate 750 is attached to an outer surface of the fingers 738 and 744 by any suitable means including gluing. The filler plate 750 may also be unitarily be formed with the fingers 738 and 744. The filler plate 750 is sized in height 752 and in and width 753 so that when the connector 736 is installed between two adjacent side members such as side members 720 and 722 (FIG. 26) the edges . . . 754 and 755 of the connector will abut edges of the flanges such as flanges 697 and 698 (FIG. 24) to effect an abutting relationship and in turn a smooth connection as shown in FIG. 26. In other words, the filler plate 750 is sized so that upon installation of the connector 736, the corner 758 will be formed to appear to be an extension of the flange edge 760 and the flange edge 761.

Figure 28:
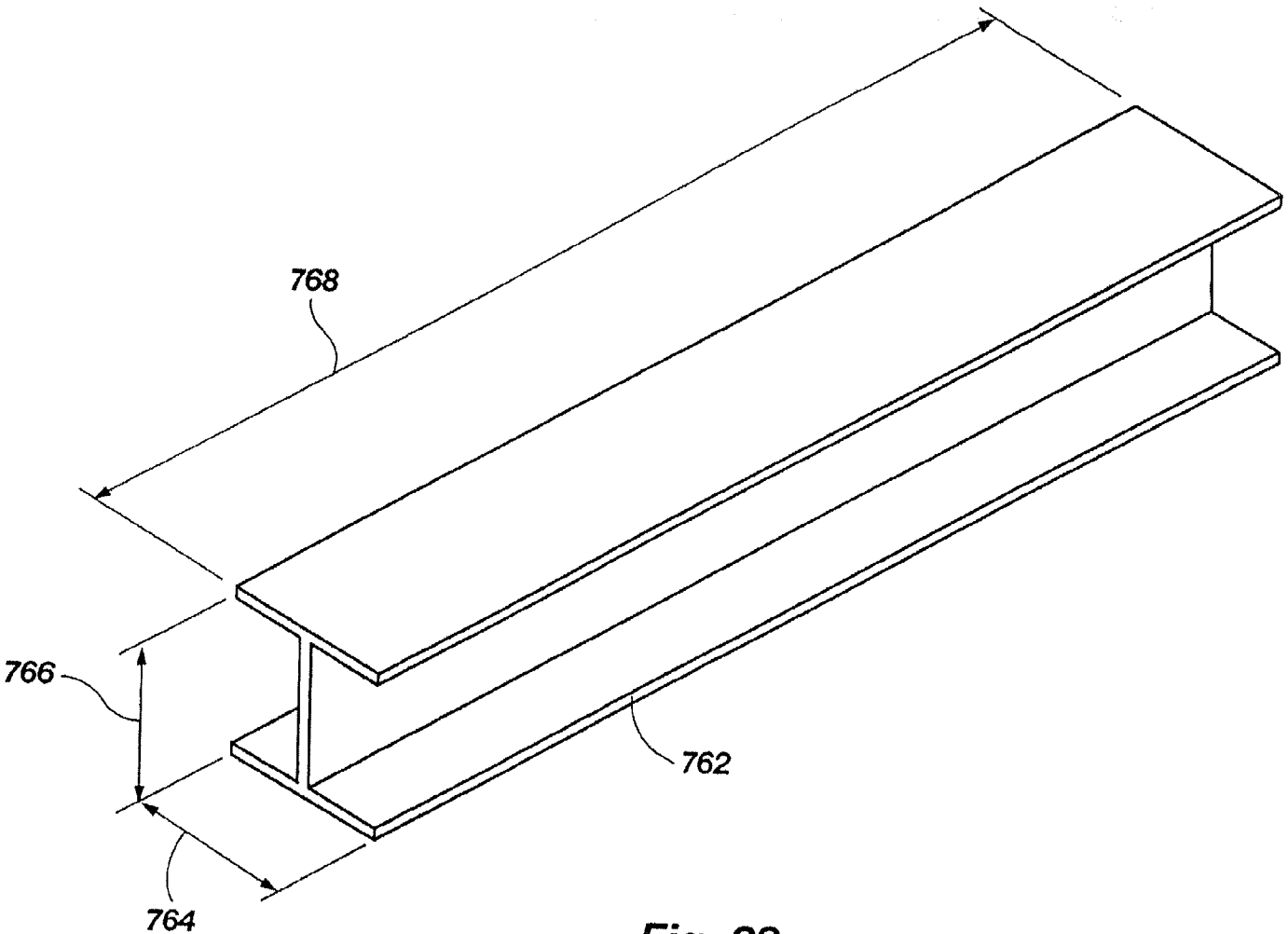
FIG. 28 is a perspective view of a connector for use in connecting sections of a side member for use with the present invention.

FIG. 26 also shows that a side member 720 may be formed of a first section 720A and a second section 720 B. A connector 762 shown in FIG. 28 is "T" shaped in cross section and sized in height 764 and 766 comparable to height 694 and 695 of a channel such as channel 618 so that the connector 762 frictionally engages a channel such as channel 618 and 622 into which it is inserted. The connector 762 has a length 768 selected to effect a secure connection in which the bending or relative movement between section 720A and 720B in the longitudinal direction or along the longitudinal axis 770 and transverse thereto 772 is limited. Thus pieces of the stock that remain after several frames have been formed can be joined together to form a side member of two or more sections. The amount of waste material is thereby reduced lowering the cost of waste removal from a building site and reducing the waste material itself so that less material need be purchased.

Figure 29:
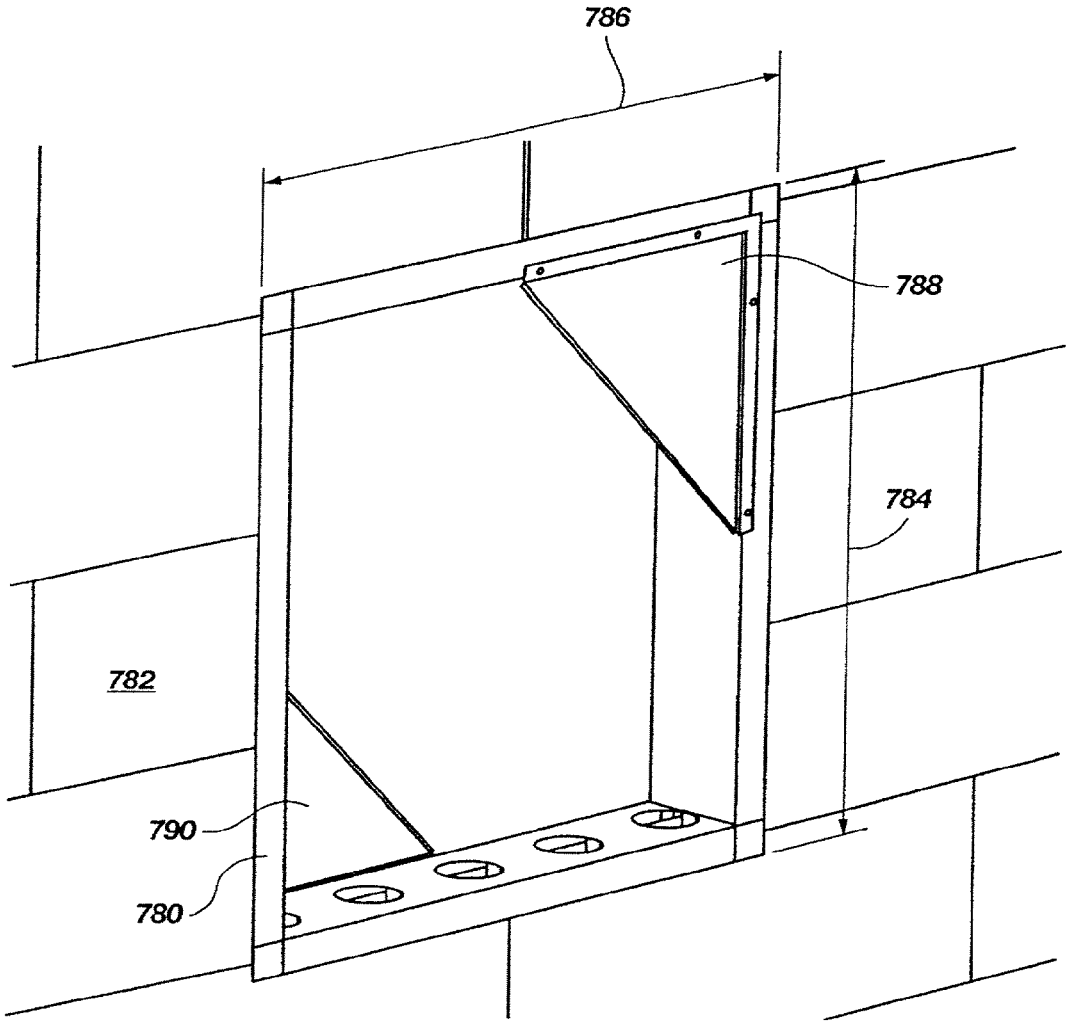
FIG. 29 is a perspective view of a window buck with corner braces.

FIG. 29 shows a frame and more specifically window buck 780 installed in wall 782. The wall 782 is made with an insulated concrete form. The window buck 780 has a height 784 which is less than 5 feet and a width that is less than 5 feet. In turn the corner braces 788 and 790 are deemed to be sufficient to brace the window buck 780. An example of a brace 788 and 790 is shown in FIG. 30.

Figure 30:
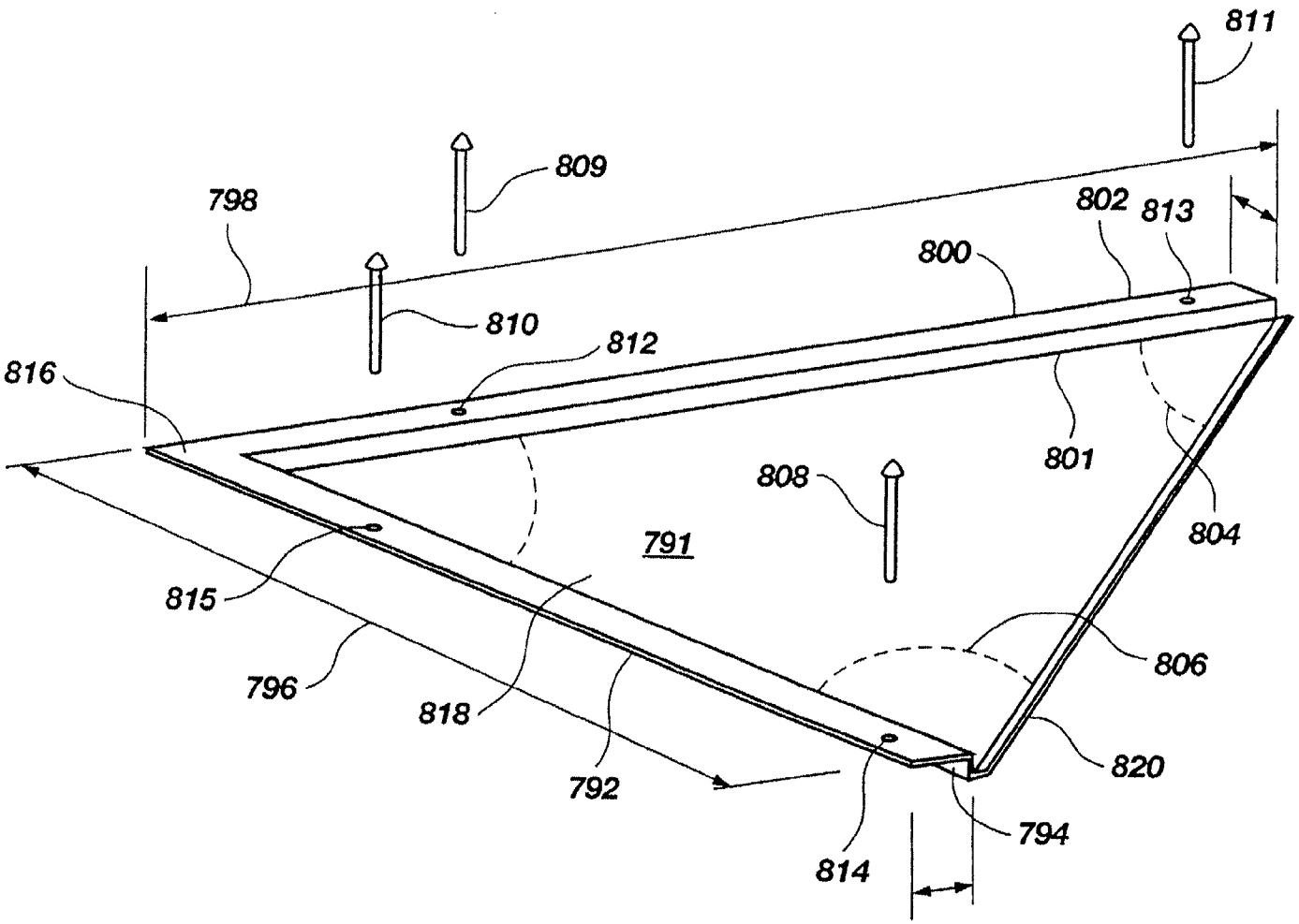
FIG. 30 is a perspective view of a corner brace for use with the present invention.

In FIG. 30, it can be seen that a corner brace 791 has a lip 792 formed along one side to create a surface 794 which is for positioning against the inner wall of a side member of a window buck or frame. Along another side a similar lip 800 is formed with a surface 801 for contact with the inner wall of a side member. Thus the corner brace in effect inserts into the inner area defined by the side members to abut the inner wall. Nails, screws or the like 808–811 are then inserted through appropriate apertures 812–815 to secure the corner brace in the corner of the frame with which it is being used. The lip 792 and the lip 800 are normal to each other and form a ninety degree angle at the corner 816. The brace has a solid interior 818 which defines an outer edge 820 that extends from the lip 792 at a 45 degree angle 806 and from the lip 800 at a 45 degree angle 804. The lip 792 and 800 are sized in length 796 and 798 respectively the same. In use the lengths 796 and 798 should be sufficient to inhibit movement of the side members. For one brace now proposed, the length 796 and 798 has been selected to be about 18 inches.

Figure 31:
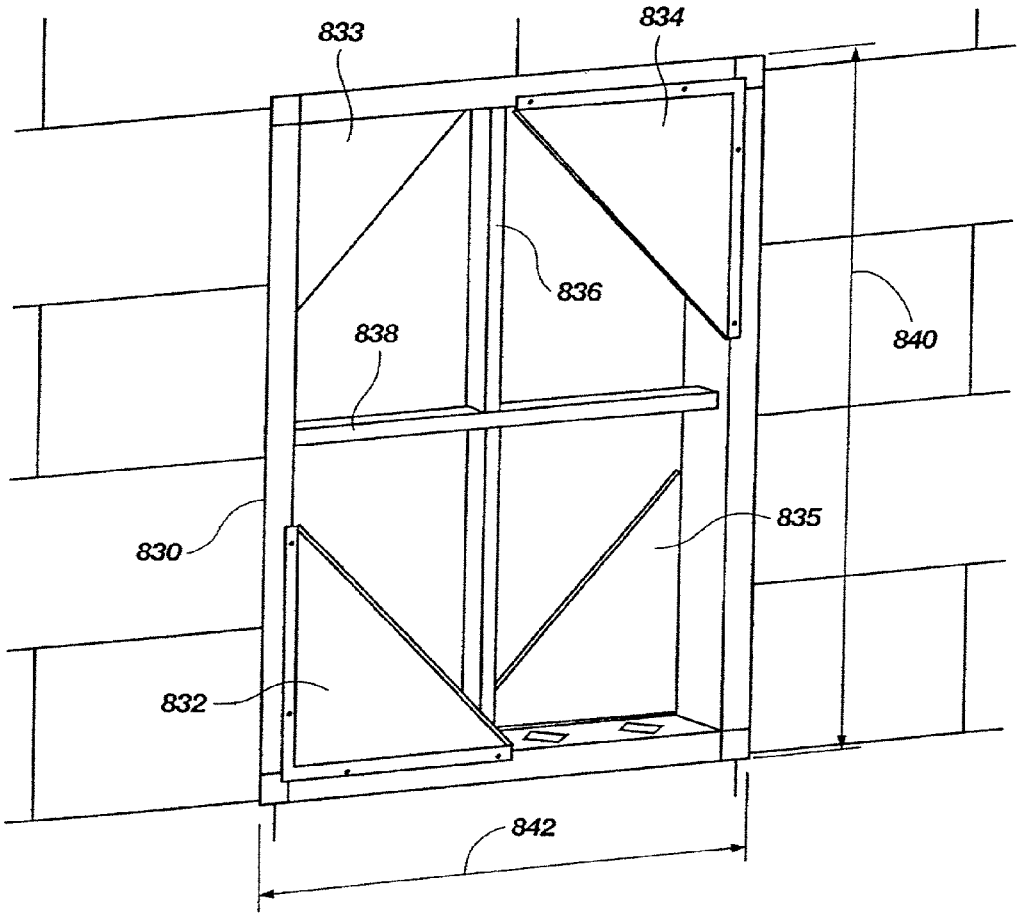
FIGS. 31–33 are perspective views of frames for use with the present invention with braces and corner braces.

FIG. 31 shows a frame which is a window buck 830 installed with four corner braces 832–835 and with cross braces 836 and 838. FIG. 31 is an example of bracing that may be used for windows in which a dimension is such that bracing every three feet is recommended or typically employed. It may be noted that the corner braces 832 and 833 are positioned on opposite sides to provide bracing on both sides of the involved frame such as window buck 830. If the height 840 warrants it, more cross braces 838 may be used. Similarly, if the width 842 warrants, it more vertical braces 836 may be used.

Figure 32:
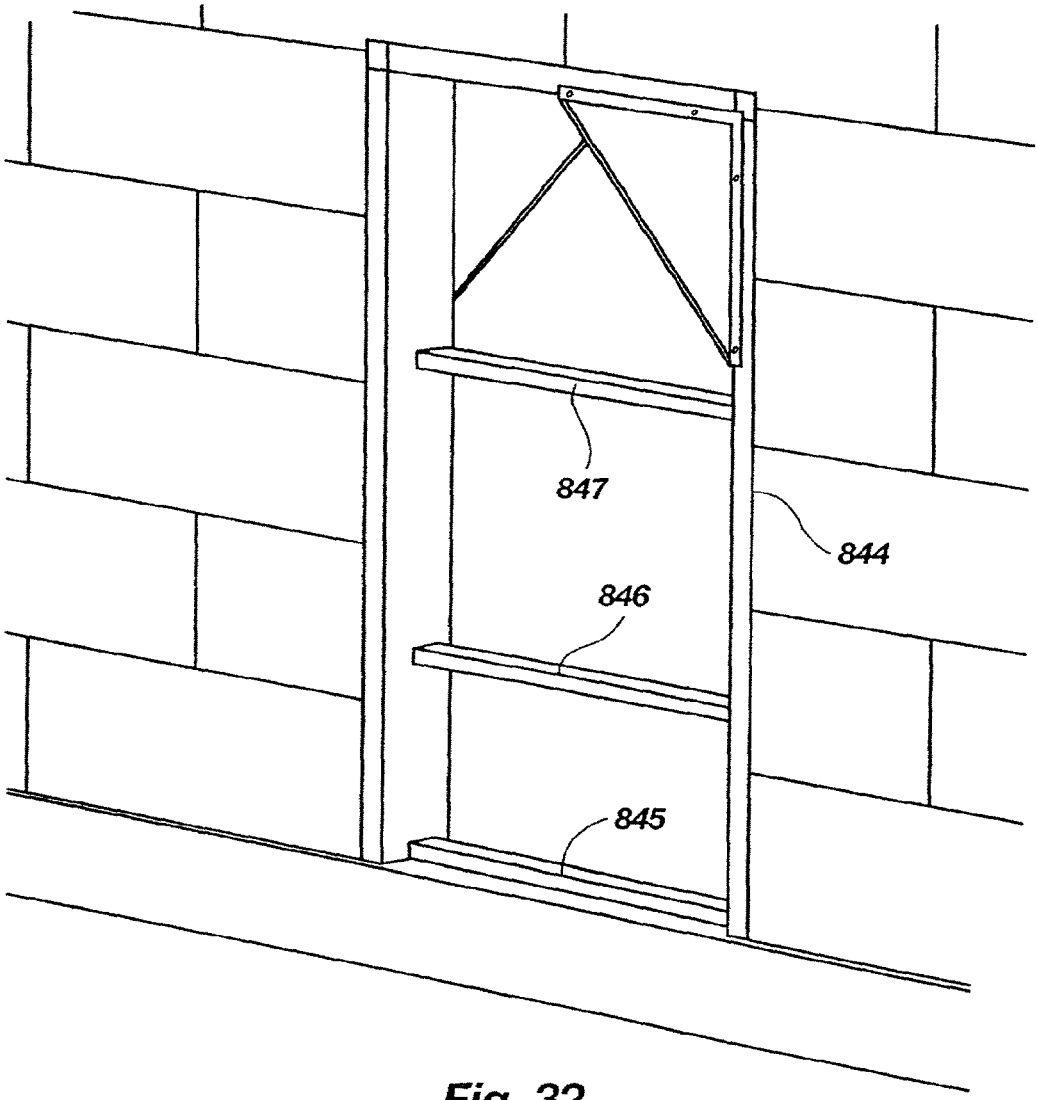
Figure 33:
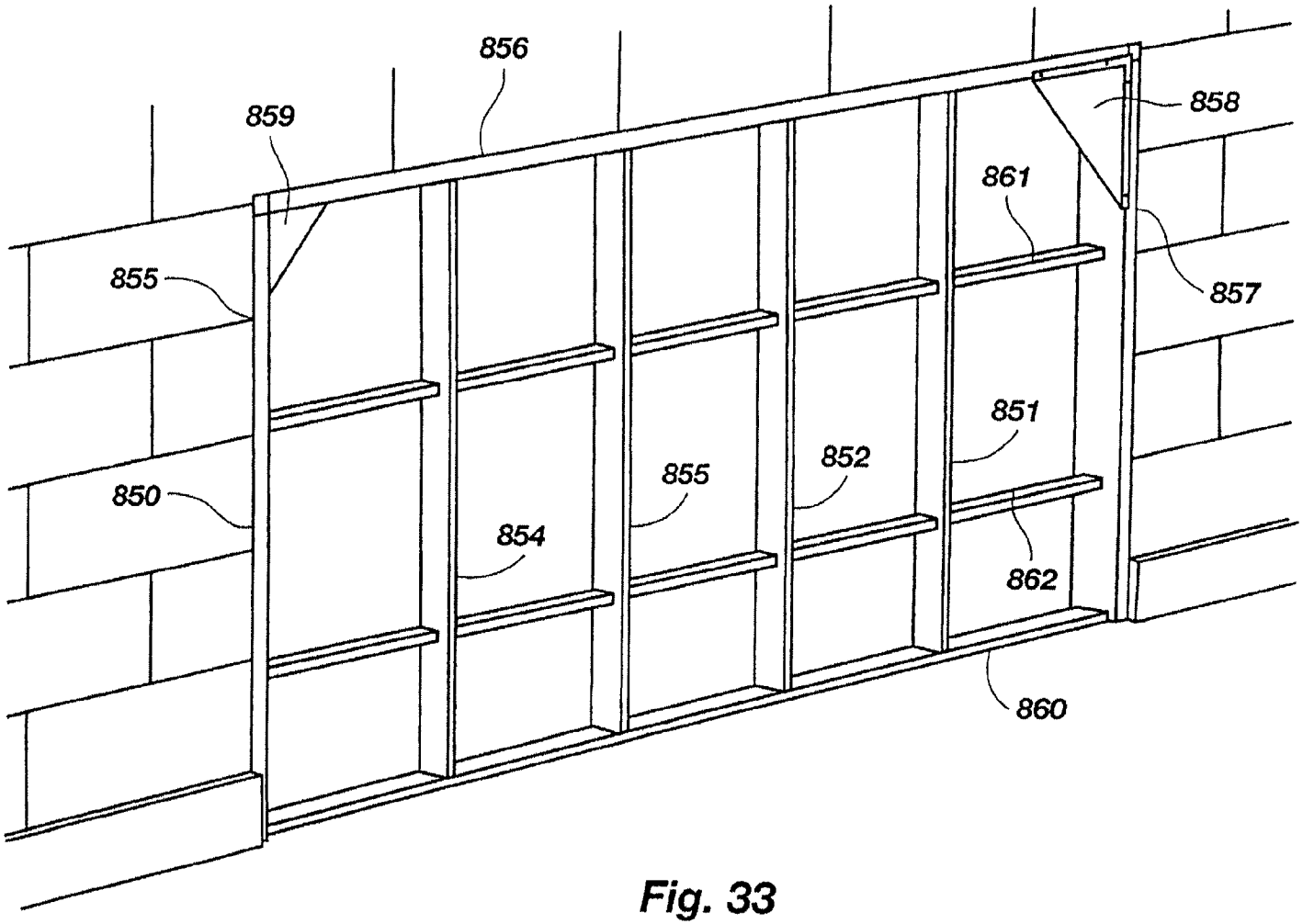

For example, the frame shown in FIG. 32 is a door frame 844 made of three side members as shown. In view of the height, more vertical braces 845–847 are typically used FIG. 32 shows a garage door frame 850 made of three adjacent side members 855, 856 and 857 in a manner similar to side members 602, 604 and 606 in FIG. 21. The side members 855–857 are secured to each other the same as the side members 602, 604 and 606. Horizontal braces 860, 861 and 862 are provided along with vertical braced 851–854 due to the extended width of the door and the opening. Corner braces 858 and 859 are also provided to stabilize the side members 855–857 and reinforce and strengthen the corners of the frame 850.

Those skilled in the art will recognize that the embodiments herein described are for purposes of illustration and explanation and are not intended to limit the scope of the claims which themselves recite the features of the invention.

What is claimed is:

1. A frame for forming an opening in a wall having an inner surface oriented toward space interior of said wall and an outer surface facing toward space exterior of said wall, said frame comprising:

a plurality of side members including a first side member, a second side member and third side member, each of which side members are configured to be assembled to define a frame opening with a frame surface oriented toward said opening, each of said plurality of side members being formed to have:

a width selected to extend between the inner surface and the outer surface of the wall into which said [at least three] *plurality of* side members are to be placed, an inner flange adapted to be positioned proximate said inner surface of said wall, an outer flange adapted to be positioned proximate the outer surface of said wall, a first end and a second end spaced from said first end, said first end of said first side member being configured for positioning adjacent one of said first end and said second end of said second side member, and said second end of said first side member being configured for positioning adjacent one of said first end and said second end of said third side member, a plurality of side by side internal channels formed between said inner flange and said outer flange, said plurality, of side by side internal channels including an outer channel positioned proximate said outer flange and an inner channel positioned proximate said inner flange, each of said plurality of side by side internal channels having a sidewall that is oriented toward said frame opening to be a part of said frame surface; and connector means for holding said first end of said first side member and one of said first end and said second end of the second side member adjacent to and in fixed relation to each other and for holding said second end of said first side member and one of said first end and said second end of said third side member adjacent to and in fixed relation to each other.

2. The frame of claim 1, wherein each of said internal channels of each side member extends between the respective said first end and said second end of each said side member to present a corresponding plurality of apertures at said first end and at said second end.

3. The frame of claim 2, wherein said connector means includes a first locking member which has a first end sized and shaped for insertion into and for frictional engagement with a selected one of said plurality of channels in said first end of said first side member, and a second end for insertion into and for frictional engagement with a selected one of said plurality of channels in one of said first end and said second end of said second side member, and said first end and said second end of said first locking member being unitarily formed to position said first side member at a desired angular orientation relative to said second side member.

4. The frame of claim 3, wherein said connector means includes a second locking member which has a first end sized and shaped for insertion into and for frictional engagement with a selected one of said plurality of channels in said second end of said first side member, and a second end for insertion into and for frictional engagement with a selected one of said plurality of channels in one of said first end and said second end of said third side member, and said first end and said second end of said second locking member being unitarily formed to position said first side member at a desired angular orientation relative to said third side member.

5. The frame of claim 4, wherein said plurality of side members includes a [forth] *fourth* side member*, said fourth side member being formed to have:*

*a width selected to extend between the inner surface and the outer surface of the wall into which said fourth side members is to be placed,*

*an inner flange adapted to be positioned proximate said inner surface of said wall,*

*an outer flange adapted to be positioned proximate the outer surface of said wall,*

*a first end and a second end spaced from said first end, said first end of said fourth side member being configured for positioning adjacent one of said first end and said second end of said second side member, and said second end of said fourth side member being configured for positioning adjacent one of said first end and said second end of said third side member, and*

*a plurality of side by side internal channels formed between said inner flange and said outer flange, said plurality of side by side internal channels including an outer channel positioned proximate said outer flange and an inner channel positioned proximate said inner flange, each of said plurality of side by side internal channels having a sidewall that is oriented toward said frame opening to be a part of said frame surface.*

6. The frame of claim 5, wherein said connector means includes a third locking member which has a first end sized and shaped for insertion into and for frictional engagement with a selected one of said plurality of channels in *said* first end of said fourth side member, and a second end for insertion into and for frictional engagement with one of said plurality of channels in the other of said first end and said second end of said second side member, and said first end and said second end of said third locking means being unitarily formed to position said fourth side member at a desired angular orientation relative to said second side member.

7. The frame of claim 6, wherein said connector means includes a fourth locking member which has a first end sized and shaped for insertion into and for frictional engagement with a selected one of said plurality of channels in *said* second end of said fourth side member, and a second end for insertion into and for frictional engagement with one of said plurality of channels in one of said first end and said second end of said third side member, and said first end and said second end of said fourth locking member being unitarily formed to position said fourth side member at a desired angular orientation relative to the third side member.

8. The frame of claim 7, wherein said connector means includes a fifth locking member which has a first end sized and shaped for insertion into and for frictional engagement with a selected one of said plurality of channels in a first end of a selected side member, and a second end for insertion into and for frictional engagement with a selected one of said plurality of channels in one of said first end and said second end of an adjacent side member, and said first end and said second end of said fifth locking member being unitarily formed to position said selected side member at a desired angular orientation relative to said adjacent side member.

9. The frame of claim 1, wherein said opening is a door opening and wherein said plurality of side members are assembled to define said door opening.

10. The frame of claim 1, wherein said opening is a garage door opening and wherein said plurality of side members are assembled to define said garage door opening.

11. The frame of claim 8, wherein said opening is a window opening and wherein said plurality of side members are assembled to define said window opening.

12. The frame of claim 11, wherein said first side member is a top of said window opening, said fourth side member is a bottom of said window opening, and wherein said top, said bottom, said third side member and said [fourth] *second* side member are assembled to form a rectangular shaped window opening.

13. The frame of claim 12, wherein said wall is of the type formed from forms positioned to receive a concrete-like material in fluidized form to cure to a solid form, and wherein said frame is positioned in said form before the concrete-like material in fluidized form is positioned in said form, and wherein said bottom has vent means formed therein for venting gases from said wall during formation of said wall from said concrete-like material.

14. The frame of claim 13, wherein said vent means includes a plurality of apertures formed in said bottom and spaced apart between said first end and said second end, at least one of said apertures being sized to receive said concrete-like material in fluidized form therethrough.

15. The frame of claim 5, wherein each of said internal channels of said side members is hollow.

16. The frame of claim 15, wherein selected channels of said plurality of channels has solution material positioned therein.

17. The frame of claim 7, wherein each channel of said plurality of channels has a longitudinal axis, and wherein said longitudinal axis of each channel of said plurality of channels are in alignment.

18. The frame of claim [13] *1*, wherein each side member includes retention means [connected to contact said concrete-like material] for securing each side member to said [concrete-like material upon curing of said concrete-like material to a solid form] *wall*.

19. The frame of claim 18, wherein each side member has a length, wherein each retention means includes at least one concrete retention fin secured to said side member sized to extend into said concrete-like material when said concrete-like material is in fluidized form and to extend substantially the length of said side member.

20. The frame of claim 2, wherein said first locking member has a filler[.] plate attached thereto and configured to abut the outer flange of each of said first side member and said second side member.

21. The frame of claim 2, wherein said first locking member has a filler plate attached thereto and configured to abut the inner flange of each of said first side member and said second side member.

22. A window buck for forming a window frame opening in a wall having an inner surface spaced from an exterior surface, said window buck comprising:

four side members for assembly into a window frame that defines a frame opening having a frame surface, each of said four side members having a length and a width and being formed to have:

a frame opening surface oriented toward said frame opening and sized to have a width substantially the width of the wall into which said window buck is to be placed, a first end and a second end, a plurality of side by side inner channels extending along the length of each side member, each of said inner channels having one side wall that is part of said frame opening surface, and each of said plurality of side by side inner channels having one wall common with an adjacent inner channel, said one wall extending away from said frame surface, and each of said plurality of side by side inner channels presenting an aperture at respective said first end and said second end of each of said four side members; and connector means for holding said first end of each of said four side members to a said second end of an adjoining side member of said four side members, said connector means including male structure formed to frictionally interconnect to a said aperture of one of said plurality of side by side inner channels at said first end and a said aperture of one of said plurality of side by side inner channels at said second end of said adjoining side member.

23. The window buck of claim 22, wherein said four side members include a first side member, a second side member, a third side member and a fourth side member, and wherein said connector means includes a first locking member for connecting said first end of said first side member to said second end of said second side member, a second locking

[means] *member* for connecting said first end of said second side member to said second end of said third side member, a third locking member for connecting said first end of said third side member to said second end of said fourth side member, and a fourth locking member for connecting said first end of said fourth side member to said second end of said first side member.

24. The window buck of claim 23, wherein said first locking member, said second locking member, said third locking member and said fourth locking member each have a first leg and a second leg oriented normally to said first leg.

25. The window buck of claim 24, wherein each of said four side members has an inner flange *adapted to be* positioned proximate the inner surface of said wall, and wherein said first locking member, said second locking member, said third locking member and said fourth locking member each have a filler plate attached thereto and configured to abut the inner flange of each of its respective adjoining side member.

26. The window buck of claim 25, wherein each of said four side members has an outer flange *adapted to be* positioned proximate the outer surface of said wall, and wherein said first locking member, said second locking member, said third locking member and said fourth locking member each have a filler plate attached thereto and configured to abut the outer flange of each of its respective adjoining side members.

27. The window buck of claim 25, wherein one of side four side members is formed with a plurality of apertures therethrough spaced apart between its first end and its second end, said apertures being sized to vent gases therethrough.

28. The window buck of claim 25, wherein said plurality of inner channels of each side member [is] *includes* four inner channels aligned one next to the other in a [row] *side by side arrangement*.

29. A method of forming an opening in a concrete wall, said method comprising:

providing a pair of spaced apart wall forms for forming walls of concrete;

securing said wall forms in a spaced apart relationship to define a wall void for receiving concrete in a fluidized form;

providing four side members for defining a window frame opening, each of said side [member means] *members* being formed to have:

a frame opening surface oriented toward said frame opening and sized to have a width substantially the width of the wall into which the [window buck is] *side members are* to be placed, a first end and a second end, a plurality of side by side inner channels extending along the length of each side member, each of said inner channels having one side wall that is part of said frame opening surface, and each of said inner channels presenting [a] *an* aperture at the respective first end and second end of said side member; and providing connector means for holding said first end of each of said four side members to a said second end of an adjoining side member of said four side members;

assembling said four side members and said connector means with said first end of one *of said side members* connected to the second end of the adjoining side member to form a four sided window buck;

positioning and securing said window buck in between said wall forms;

putting fluidized concrete in said wall void to surround said window buck;

allowing said fluidized concrete to cure; and removing said wall forms after said fluidized concrete has cured.

30. The method of claim 29, further including:

providing bracing means for bracing the window buck when installed before putting uncured [mixed] *fluidized* concrete [therewith] *in said wall void*;

installing said bracing means to extend between selected side members of said four side members before putting said fluidized concrete in said void;

removing said bracing means from said window buck.

31. The method of claim 30, wherein said bracing means includes a corner member configured to attach to two adjacent side members of said four side members proximate the corner defined by the connection of two adjacent side members.

32. The method of claim 31, wherein said corner member is a [one] triangular corner stiffener.

33. The method of claim 30, wherein said bracing means includes at least one brace member sized to extend between two opposite side members of said four side members.

34. A method of forming a door opening in a concrete wall, said method comprising:

providing a pair of spaced apart wall forms for forming walls of concrete;

securing said wall forms in a spaced apart relationship to define a wall void for receiving concrete in a fluidized form;

providing three side members for defining a door opening, each of said three side members being formed to have:

a door opening surface oriented toward said door opening and sized to have a width substantially the width of the concrete wall, a first end and a second end, a plurality of side by side inner channels extending along the length of each side member [and exterior of said inner wall], each of said inner channels having one side wall that is part of said door opening surface, and each of said inner channels defining a corresponding plurality of apertures at the respective first end and second end of each of said side members; and providing connector means for holding said first end of a first side member to a said second end of an adjoining second side member and for holding the first end of said second side member to the first end of a third side member;

assembling said three side members and said connector means with said first end of said first side member connected to said second end of said second side member and with said first end of said second side member connected to the second end of said third side member to form a three sided door frame;

positioning and securing said door frame in said form;

putting fluidized concrete in said void to surround said door frame;

allowing said fluidized concrete to cure; and removing said [cement] *wall* form after said fluidized concrete has cured.

35. The method of claim 34, further including:

providing bracing means for bracing the door frame when installed before putting fluidized concrete [therewith] *in said void*;

installing said bracing means to extend between selected side members of said three side members before putting said fluidized concrete in said void;

removing said bracing means from said [window buck] *side members*.

36. The method of claim 35, wherein said bracing means includes a corner member configured to attach to two adjacent side members of said three side members proximate the corner defined by the connection of two adjacent side members.

37. A frame for forming an opening in a wall having an inner surface and an outer surface, said frame comprising:

a plurality of side members including a first side member, a second side member and *a* third side member, each of which side members are configured to be assembled to define a [perimeter with a] frame opening and a frame surface oriented toward said opening, each of said plurality of side members being formed to have:

a width selected to extend between the inner surface and the outer surface of the wall into which said at least three side members are to be placed, an inner flange adapted to be positioned proximate said inner surface of said wall, an outer flange adapted to be positioned proximate the outer surface of said wall, a first end and a second end spaced from said first end, said first end of said first side member being configured for positioning adjacent one of said first end and said second end of said second side member, and said second end of said first side member being configured for positioning adjacent one of said first end and said second end of said third side member, a plurality of side by side internal channels formed between said inner flange and said outer flange, said plurality of side by side internal channels including an outer channel positioned proximate said outer flange and an inner channel positioned proximate said inner flange, at least two of said plurality of side by side internal channels having a common sidewall therebetween; and connector means for holding said first end of said first side member and one of said first end and said second end of the second side member adjacent to and in fixed relation to each other and for holding said second end of said first side member and one of said first end and said second end of said third side member adjacent to and in fixed relation to each other.

* * * * *